US008354479B2

(12) United States Patent
Satoh et al.

(10) Patent No.: US 8,354,479 B2
(45) Date of Patent: Jan. 15, 2013

(54) FUNCTIONAL FILLER AND RESIN COMPOSITION CONTAINING SAME

(75) Inventors: Masahiro Satoh, Kyoto (JP); Fengzhe Jin, Kyoto (JP); Yoshikazu Kondo, Kyoto (JP)

(73) Assignee: Dai-ichi Kogyo Seiyaku Co., Ltd., Kyoto (JP)

( * ) Notice: Subject to any disclaimer, the term of this patent is extended or adjusted under 35 U.S.C. 154(b) by 102 days.

(21) Appl. No.: 12/956,589

(22) Filed: Nov. 30, 2010

(65) Prior Publication Data
US 2011/0098419 A1  Apr. 28, 2011

Related U.S. Application Data

(62) Division of application No. 11/992,744, filed as application No. PCT/JP2006/319588 on Sep. 29, 2006, now Pat. No. 7,902,304.

(30) Foreign Application Priority Data

| Oct. 3, 2005 | (JP) | 2005-290593 |
| Nov. 7, 2005 | (JP) | 2005-322519 |
| Apr. 28, 2006 | (JP) | 2006-126901 |
| May 31, 2006 | (JP) | 2006-152523 |

(51) Int. Cl.
*C08G 77/04* (2006.01)
*C08G 63/08* (2006.01)

(52) U.S. Cl. ........ 525/450; 528/361

(58) Field of Classification Search .......... 525/450; 528/361
See application file for complete search history.

(56) References Cited

U.S. PATENT DOCUMENTS

| 5,264,030 A | 11/1993 | Tanabe et al. |
| 6,124,384 A | 9/2000 | Shiraishi et al. |
| 6,803,443 B1 | 10/2004 | Ariga |
| 7,202,289 B2 * | 4/2007 | Nozaki et al. ................. 523/449 |
| 7,439,283 B2 | 10/2008 | Tanaka et al. |
| 2004/0157967 A1 | 8/2004 | Ito |
| 2007/0032631 A1 | 2/2007 | Ouchi et al. |

FOREIGN PATENT DOCUMENTS

| EP | 0 814 092 | 12/1997 |
| EP | 1 188 781 | 3/2002 |
| EP | 1 389 630 | 2/2004 |
| EP | 1 681 316 | 7/2006 |
| JP | 4-318042 | 11/1992 |
| JP | 07145239 | 6/1995 |
| JP | 07145239 A * | 6/1995 |
| JP | 7-206851 | 8/1995 |
| JP | 8-183899 | 7/1996 |
| JP | 9-143253 | 6/1997 |
| JP | 2004-75772 | 3/2004 |
| JP | 2004-224990 | 8/2004 |
| JP | 2004-277575 | 10/2004 |
| JP | 2004-323758 | 11/2004 |
| JP | 2005-112456 | 4/2005 |
| JP | 2005-139270 | 6/2005 |
| JP | 2005-200600 | 7/2005 |
| WO | 2004/022650 | 3/2004 |

OTHER PUBLICATIONS

JP 07145239 A, Machine translation.*

(Continued)

*Primary Examiner* — Satya Sastri
(74) *Attorney, Agent, or Firm* — Wenderoth, Lind & Ponack, L.L.P.

(57) ABSTRACT

The present invention provides a functional filler which is excellent in dispersibility or interaction with polylactic acid as a matrix polymer and can improve heat resistance, moldability and mechanical strength of the polylactic acid; and a resin composition containing the functional filler. The functional filler of the present invention is characterized in including a raw material filler and polylactic acid, wherein a surface or end the raw material filler is modified by the polylactic acid.

3 Claims, 3 Drawing Sheets

OTHER PUBLICATIONS

International Search Report issued Dec. 26, 2006 in the International (PCT) Application PCT/JP2006/319588 of which the parent application is the U.S. National Stage.

Supplementary European Search Report issued Feb. 19, 2010 in counterpart European Application No. 06810943 (in the English language).

JP 07145239, A. Nakamura et al., 06-19195, Machine translation of abstract and document.

Japanese Office Action (with English translation) issued Jul. 17, 2012 in corresponding Japanese Patent Application No. 2007-538749.

Chinese Office Action (with English translation) issued Sep. 14, 2012 in corresponding Chinese Application No. 200680035935.7.

Japanese Office Action issued Oct. 9, 2012 in corresponding Japanese Application No. 2007-538749, with English translation thereof.

* cited by examiner

FUNCTIONAL FILLER AND RESIN COMPOSITION CONTAINING SAME

This application is a divisional application of U.S. application Ser. No. 11/992,744, filed Mar. 28, 2008, now U.S. Pat. No. 7,902,304, which is the national phase filing of International Patent Application No. PCT/JP2006/319588, filed Sep. 29, 2006.

TECHNICAL FIELD

The present invention relates to a functional filler, a functional filler composition containing the functional filler, a resin composition containing the functional filler, production methods thereof, and a molded body including the resin composition.

BACKGROUND ART

Polylactic acid is one kind of biodegradable polymer, and can be produced using reproducible plant resources, food residuals from everyday life, old papers or the like and without using petroleum resources. Further, since the waste thereof is degraded in nature, it is less likely that the disposal of the waste becomes a problem as with conventional plastic products. Therefore, polylactic acid is expected to play a large role in solving problems of resources, energy and environment from the present to the future.

Specifically, in the case that polylactic acid is used for agricultural materials or the like, it is not necessary to collect them after use. Further, in case that polylactic acid is used in a packing container of a packed lunch at a convenience store or food, the container can be disposed as garbage without separating leftovers or food after use. Therefore, since polylactic acid allows the rationalization of a material cycle or transportation by utilizing characteristics of a biodegradable resin originated in plants, polylactic acid can contribute largely to saving labor and saving energy. Further, also in the case of using polylactic acid in living bodies, since its degradation products are lactic acid, carbon dioxide and water, which are harmless to a human body, polylactic acid can be used as a medical material or the like.

However, while polylactic acid is excellent in transparency as PS resin and PET resin, there is a problem of being inferior in heat resistance, moldability and mechanical strength such as impact property. Such properties have been a problem on attempting to expand a broad range of use.

In order to improve the heat resistance, moldability and mechanical strength such as impact property of polylactic acid, a method is attempted, in which fillers such as silica is blended with polylactic acid. Such a technique is described in Japanese publication of patent application Nos. 2005-200600, 2005-112456 and 2004-224990.

DISCLOSURE OF THE INVENTION

As described above, the technique in which filler such as silica is blended with polylactic acid to improve heat resistance and the like is known. However, the dispersibility in polylactic acid as a matrix polymer and the interaction with polylactic acid of filler such as silica which is used conventionally are insufficient. Therefore, the improvement has not been achieved so that the heat resistance, moldability and mechanical strength such as impact property can bear the practical demand even when these fillers are blended with polylactic acid.

The problem to be solved by the present invention is to provide a functional filler which is excellent in dispersibility in polylactic acid as a matrix polymer, in interaction with polylactic acid, and in improvement effect of heat resistance, moldability and mechanical strength such as impact property of polylactic acid, and a functional filler composition and a resin composition containing the functional filler. Further, an object of the present invention is also to provide a method of producing the functional filler and the like, and a molded body including the above-described resin composition.

In order to solve the above-described problems, the present inventors have made eager investigations, particularly on a filler to be added to polylactic acid composition. As a result, the inventors found that a filler is modified with a substituent which interacts with molecules of polylactic acid as a matrix polymer by utilizing the properties of strong interaction of an optically active polylactic acid oligomer or polymer, such as poly-D-lactic acid, with a polylactic oligomer or polymer which is an optical isomer, such as poly-L-lactic acid, to solve the above problems. More specifically, since such a functional filler interacts with multiple polylactic acid molecules and has a so-called action effect for crosslinking multiple polylactic acid molecules, heat resistance, strength and the like of the polylactic acid can be improved.

The functional filler of the present invention is characterized in comprising a raw material filler and polylactic acid, wherein a surface or end the raw material filler is modified by the polylactic acid.

The functional filler composition of the present invention is characterized in comprising the above functional filler and non-bonded polylactic acid produced during production of the above functional filler.

The resin composition of the present invention is characterized in comprising the above functional filler and polylactic acid as a matrix polymer, wherein the polylactic acid as a matrix polymer at least partly interacts with the polylactic acid modifying the surface or end of the functional filler.

The method for producing the above functional filler according to the present invention is characterized in comprising steps of: mixing lactic acid solution and/or lactide solution or lactic acid melt and/or lactide melt with the raw material filler; and polymerizing the lactic acid and/or lactide to modify the surface or end of the raw material filler with polylactic acid.

The method for producing the functional filler composition according to the present invention is characterized in comprising steps of: using an excessive amount of lactic acid and/or lactide to the raw material filler during mixing lactic acid solution and/or a lactide solution or lactic acid melt and/or lactide melt with the raw material filler; and polymerizing the lactic acid and/or lactide to modify the surface or end of the raw material filler with polylactic acid.

The method for producing the resin composition according to the present invention is characterized in comprising steps of: mixing lactic acid and/or lactide solution or lactic acid melt and/or lactide melt with the raw material filler; polymerizing the lactic acid and/or lactide to modify the surface or end of the raw material filler with polylactic acid to obtain the functional filler; and mixing the functional filler with the polylactic acid as a matrix polymer at least partly interacting with polylactic acid modifying the surface or end of the functional filler.

The molded body of the present invention is characterized in comprising the above resin composition.

According to the present invention, the following effects can be exerted. The filler surface is modified with polylactic acid which interacts with polylactic acid as a matrix polymer, to largely improve the dispersibility of the filler in the matrix polymer. Further, polylactic acid on the filler surface and the matrix polymer form a stereo complex, to improve the heat resistance and strength of the obtained resin composition. Furthermore, since the stereo complex functions as a nucleating agent, the crystallization speed of the resin composition becomes fast; and the molding speed, the stretching temperature and the stretching ratio can be improved. Therefore, physical properties and moldability of the obtained molded product can be improved, and thus applications can be expanded. In addition, since the obtained molded body is reinforced with fillers, the strength thereof is high. With the characteristics of the functional filler of the present invention described above, in the case of performing a treatment such as stretching and molding on the resin composition of the present invention in a solid state or a melt state, uniform stretching and molding can be performed due to a small crystal size, a filler effect, a high melt viscosity or the like, and stability during production of a stretched product or a molded product and quality and performance of the product can be improved.

BEST MODE FOR CARRYING OUT THE INVENTION

Figure 1:
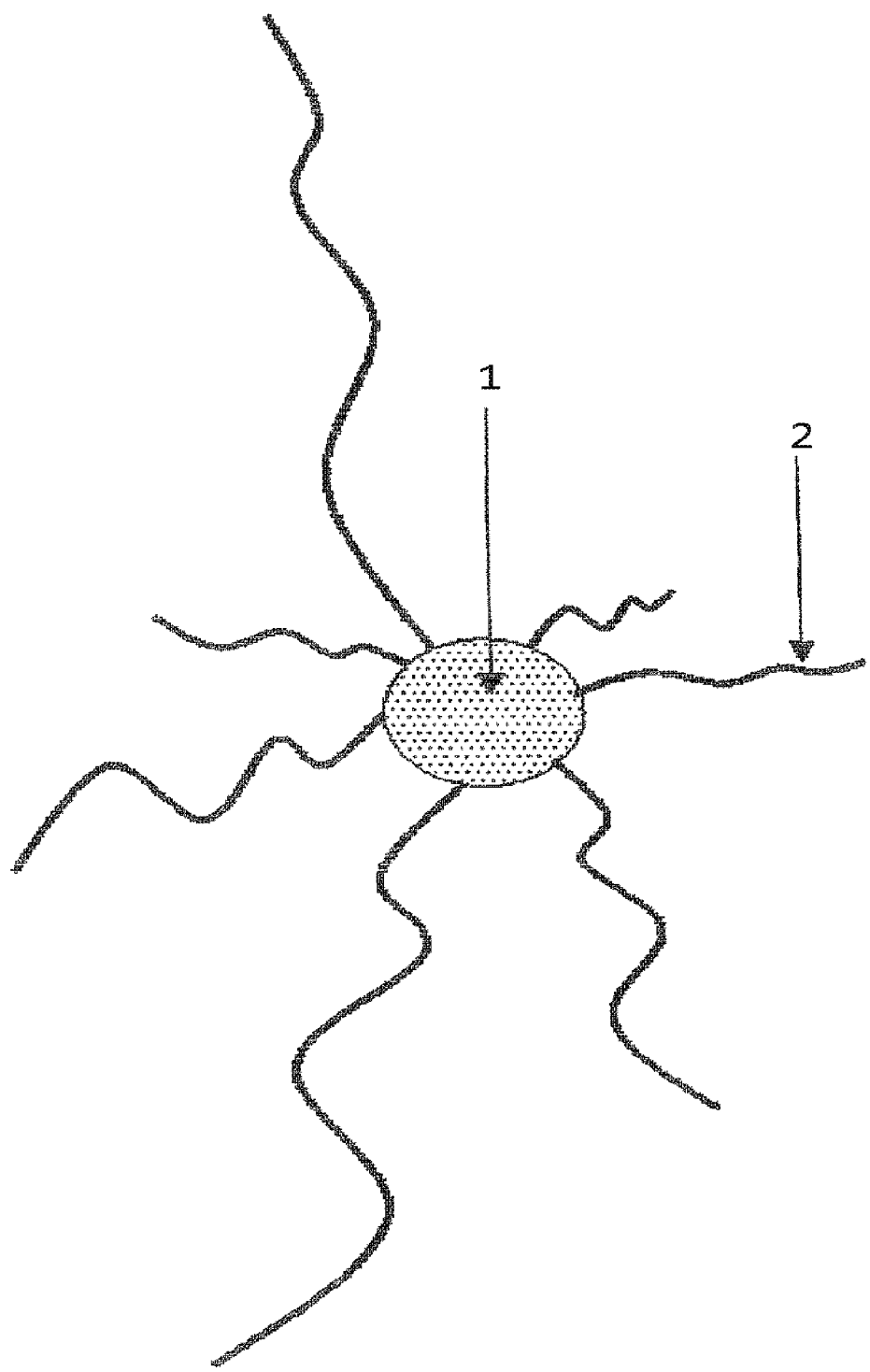
FIG. 1 is a schematic view showing an outline of the functional filler of the present invention. In the figure, a reference numeral 1 represents a raw material filler, and a reference numeral 2 represents polylactic acid bonded on the filler surface.

The functional filler of the present invention includes a raw material filler and polylactic acid, wherein the surface or end of the raw material filler is modified. FIG. 1 is a schematic view showing an outline of the functional filler of the present invention. Hereinafter, the polylactic acid which modifies the surface or end of the filler may be sometimes referred to as "polylactic acid (A)".

Conventionally, a method, in which the surface of silica is modified with a silane-coupling agent to increase compatibility with polylactic acid, has been used for silica generally used as a filler of polylactic acid, in order to increase dispersibility in an aliphatic ester such as polylactic acid. However, the effect thereof has not been sufficient. On the other hand, in the present invention, polylactic acid which is further excellent in compatibility with polylactic acid than the silica coupling agent is introduced on the surface of the filler, thereby to extremely increase the dispersibility and the interaction in the polylactic acid.

In more detail, an optically active lactic acid oligomer or polymer such as poly-D-lactic acid strongly interacts with a lactic acid oligomer or polymer which is an optically isomer such as poly-L-lactic acid. Therefore, when, for example, a mixture of poly-D-lactic acid and poly-L-lactic acid is used as a matrix polymer, since the matrix polymers interact with each other, heat resistance or the like of polylactic acid composition material is considered to be improved. However, in such an embodiment, the probability that one poly-D-lactic acid interacts with one poly-L-lactic acid is considered to be high, and the probability that one poly-D-lactic acid interacts with two or more poly-L-lactic acids is considered to be extremely low. On the other hand, the functional filler of the present invention can be bonded to multiple matrix polymer molecules depending on the number of polylactic acids bonded to the surface or end of the filler, and therefore a stereo complex is formed. As a result, it becomes possible to remarkably improve the heat resistance or the like of the polylactic acid composition material.

Polylactic acid of which at least part interacts with a matrix polymer molecule may be selected as polylactic acid (A). For example, in case that the matrix polymer molecule is poly-D-lactic acid, polylactic acid (A) which at least partly has an oligomer or polymer part including L-lactic acid is used, and poly-L-lactic acid having mainly L-lactic acid is preferably used. Further, when a block of D-lactic acid is referred to X and a block of L-lactic acid is referred to Y, for example, in case that polylactic acid as a matrix polymer is a block copolymer of X—Y—X, polylactic acid (A) is preferably made to be a block copolymer of Y—X—Y. Furthermore, for example, in case that polylactic acid as a matrix polymer is a mixture of poly-D-lactic acid and poly-L-lactic acid, polylactic acid (A) may be also made to be a mixture of poly-D-lactic acid and poly-L-lactic acid. Further, if at least a part of polylactic acid (A) can interact with a matrix polymer molecule, the polylactic acid (A) may be a random copolymer of D-lactic acid and L-lactic acid. In any cases, polylactic acid (A) can be selected appropriately depending on the optical characteristics of the matrix polymer.

In the present invention, a "poly-D-lactic acid" and "poly-L-lactic acid" are not limited to ones constituted with only D-lactic acid and L-lactic acid, respectively, and may each mainly include D-lactic acid and L-lactic acid, respectively, as a main constituent. Here, "as a main constituent" means that the content of D-lactic acid or L-lactic acid in lactic acid constituting a "poly-D-lactic acid" or "poly-L-lactic acid", respectively, is preferably 80% by weight or more, more preferably 85% by weight or more, and further preferably 90% by weight or more. Components other than D-lactic acid or L-lactic acid in poly-D-lactic acid or poly-L-lactic acid may be each optical isomer, that is L-lactic acid for poly-D-lactic acid, and may be other components which can be polymerized with lactic acid. Examples of other components which can be polymerized with lactic acid include a divalent or more alcohol compound, a divalent or more carboxylic acid compound, and a ring-opening polymerizable compound such as cyclic lactone, cyclic ether and cyclic lactam.

Polylactic acid shows high crystallinity and is excellent in heat resistance and mechanical properties, when the ratio of L-lactic acid or D-lactic acid is high, that is when optical purity thereof is high. On the other hand, a copolymer with a relatively high ratio of L-lactic acid in poly-D-lactic acid or of D-lactic acid in poly-L-lactic acid is low in crystallinity or is amorphous, additionally low in heat resistance and low in mechanical property. Therefore, polylactic acid with high optical purity is preferable as the polylactic acid of the present invention. Homo-poly-D-lactic acid or homo-poly-L-lactic acid consisting of substantially 100% of optically active lactic acid is preferably used as polylactic acid (A).

Polylactic acid (A) preferably has a number-average molecular weight of 100 to 1,000,000. When the molecular weight is 100 or more, the dispersibility of the function filler according to the present invention in the matrix polymer can be secured sufficiently. On the other hand, when the molecular weight is 1,000,000 or less, the stereo complex can be formed sufficiently. Moreover, the number-average molecular weight can be measured using a GPC, i.e. gel permeation chromatography, measurement as described later.

The functional filler of the present invention is one in which the surface or end of the raw material filler is modified with polylactic acid (A). This modification is performed by chemically and/or physically bonding polylactic acid (A) to the surface or end of the raw material filler. Here, example of the chemical bond includes an ester bond formed with a hydroxy group of the terminal lactic acid molecule of the polylactic acid, an ester bond and an amide bond formed with a carboxyl group of the terminal lactic acid molecule, or the like. Further, example of the physical bond includes an ion bond, a hydrogen bond, and the like. Therefore, when the raw material filler is one which has a functional group capable of being chemically and/or physically bonded to a carboxyl group, a hydroxy group or a carbonyl group on the surface or end, the filler can be easily modified with polylactic acid (A). Example of such a functional group includes hydrophilic functional groups such as an amino group, a hydroxy group, a carboxyl group and an epoxy group. In case that the raw material filler does not have these hydrophilic functional groups on surface or end thereof, the hydrophilic functional group may be introduced using a known method. Further, the carboxyl group or the like may be active-esterified in order to increase reactivity.

The raw material filler may be any of an inorganic stick-shaped filler, a layer-shaped filler, a partiparticle-shaped filler and sol solutions thereof, and an organic compound, i.e. organic filler, which dissolves or disperses homogenously with the polymer matrix can be used. Further, metal alkoxides which are raw materials of the inorganic filler can be also used.

The stick-shaped filler, that is a fibrous filler or a needle-shaped filler, is preferably one which has the highest aspect ratio, i.e. length/diameter or diameter/length, and can largely improve mechanical characteristics of the resin composition. Specific example thereof includes an inorganic fibrous and needle-shaped filler such as glass fiber, asbestos fiber, carbon fiber including a fibrous new carbon such as carbon nanotube, a needle-shaped new carbon and a sphere-shaped new carbon such as fullerene, graphite fiber, metal fiber, stick-shaped hydroxyapatite, potassium titanate whisker, aluminum borate whisker, magnesium whisker, silicon whisker, wollastonite; sepiolite, slag fiber, Zonolite, Ellestadite, boehmite, plaster fiber, silica fiber, alumina fiber, silica and alumina fiber, zirconia fiber, boron nitride fiber and boron fiber; and an organic fibrous filler such as polyester fiber, nylon fiber, acrylic fiber, cellulose filer, acetate fiber, aramide fiber, kenaf fiber, lamy, cotton, jute, hemp, sisal, flax, linen, silk, manila hemp, wood pulp, old paper and wool.

A layer-shaped filler or a plate-shaped filler is inferior in impact strength compared with a partiparticle-shaped filler, however, has a higher aspect ratio than that of the partiparticle-shaped filler, and therefore the layer-shaped or plate-shaped filler has advantages such as large improvement effect of rigidity and excellent dimensional stability. Specific example includes natural and synthetic smectite or the like, and more specifically clay such as Kunipia (registered trademark) P manufactured by Kunimine Industries Co., Ltd., and smectone; plate-shaped alumina, talc, mica, cerisite, glass flakes, various metal foils, black lead, plate-shaped calcium carbonate, plate-shaped aluminum hydroxide, plate-shaped magnesium hydroxide or the like, as a material.

Sphere-shaped and amorphous partiparticle-shaped fillers are ones having an aspect ratio close to 1. Specific example includes ones having hydroxyapatite, calcium carbonate, silica, mesoporous silica, zirconia, alumina, Y—PSZ, spinel, talc, mullite, cordierite, silicon carbide, aluminum nitride, hematite, cobalt blue, cobalt violet, cobalt green, magnetite, Mn—Zn ferrite, Ni—Zn ferrite, yttrium oxide, cerium oxide, samarium oxide, lanthanum oxide, tantalum oxide, terbium oxide, europium oxide, neodymium oxide, zinc oxide, titanium oxide, magnesium fluoride, tin oxide, antimony-containing tin oxide (ATO), tin-containing indium oxide, barium titanate, PT, PZT, PLZT and clay as a material; various crushed ore products; various beads; various balloons and the like.

Example of the sol solution includes a silica sol solution, a boehmite sol solution or the like, manufactured by Nissan Chemical Industries, Ltd., Fuso Chemical Co., Ltd., and Kawaken Fine Chemicals Co., Ltd.

Example of the metal alkoxides includes silicon-based alkoxides, titanium-based alkoxides, aluminum-based alkoxides, zirconium-based alkoxides, tin-based alkoxides, germanium-based alkoxides, rare earth element-based alkoxides, and mixture and/or complex alkoxide thereof.

Example of the silicon-based alkoxides includes tetraalkoxysilane having an alkoxy group having 1 to 5 carbon atoms, such as tetraethoxysilane; methyltrialkoxysilane such as methyltriethoxysilane; phenyltrialkoxysilane such as phenyltriethoxysilane; dimethyldialkoxysilane such as dimethyldiethoxysilane; diphenyldialkoxysilane such as diphenyldimethoxysilane and diphenylsilanediol; vinyltrialkoxysilane such as SILA-ACE (registered trademark) S210 and S220 manufactured by Chisso Corporation; N-(2-aminoethyl)-3-aminopropylmethyldialkoxysilane such as SILA-ACE S310 manufactured by Chisso Corporation; N-(2-aminoethyl)-3-aminopropyltrialkoxysilane such as SILA-ACE S320 manufactured by Chisso Corporation; 3-aminopropyltrialkoxysilane such as SILA-ACE S330 and S360 manufactured by Chisso Corporation; 3-glycidoxypropyltrialkoxysilane such as SILA-ACE S510 manufactured by Chisso Corporation; 3-glycidoxypropylmethyldialkoxysilane such as SILA-ACE S520 manufactured by Chisso Corporation; 2-(3,4-epoxycyclohexyl)ethyltrialkoxysilane such as SILA-ACE S530 manufactured by Chisso Corporation; 3-chloropropylmethyldialkoxysilane such as SILA-ACE S610 manufactured by Chisso Corporation; 3-chloropropyltrialkoxysilane such as SILA-ACE S620 manufactured by Chisso Corporation; 3-methacryloxypropyltrialkoxysilane such as SILA-ACE S710 manufactured by Chisso Corporation; 3-mercaptopropyltrialkoxysilane such as SILA-ACE S810 manufactured by Chisso Corporation; N-(1,3-dimethylbutylidene)-3-(trialkoxysilyl)-1-propaneamine such as SILA-ACE S340 manufactured by Chisso Corporation; N-[2-(vinylbenzylamino)ethyl]-3-aminopropyltrialkoxysilane hydrochloride such as SILA-ACE S350 manufactured by Chisso Corporation; N,N'-bis[3-(trialkoxysilyl)propyl]ethylenediamine such as SILA-ACE XS1003 manufactured by Chisso Corporation; an oligomer of an amino-based silane coupling agent such as SILA-ACE Oligomer MS3201, MS3202, MS3301 and MS3302 manufactured by Chisso Corporation; an oligomer of an epoxy-based silane coupling agent such as SILA-ACE Oligomer MS5101 and MS5102 manufactured by Chisso Corporation; a terminal-hydrogenated polydimethylsiloxane such as SILAPLANE (registered trademark) FM-1111, SILAPLANE FM-1121 and SILAPLANE FM-1125 manufactured by Chisso Corporation; a terminal-vinylated polydimethylsiloxane such as SILAPLANE FM-2231 manufactured by Chisso Corporation; a methacryloxyl group-terminated polydimethylpolysiloxane such as SILAPLANE FM-7711, SILAPLANE FM-7721, SILAPLANE FM-7725, SILAPLANE FM-0711, SILAPLANE FM-0721, SILAPLANE FM-0725, SILAPLANE TM-0701 and SILAPLANE TM-0701T manufactured by Chisso Corporation; a terminal-hydroxylated polydimethylsiloxane such as SILAPLANE FM-0411, SILAPLANE FM-0421, SILAPLANE FM-0425, SILAPLANE DA-11, SILAPLANE DA-21 and SILAPLANE DA-25 manufactured by Chisso Corporation; a terminal-epoxylated polydimethylsiloxane such as SILAPLANE FM-0511, SILAPLANE FM-0521 and SILAPLANE FM-0525 manufactured by Chisso Corporation; a terminal-carboxylated polydimethylsiloxane such as SILAPLANE FM-0611, SILAPLANE FM-0621 and SILAPLANE FM-0625 manufactured by Chisso Corporation; polysilsesquioxane such polymethylsilsesquioxane (100% methyl), polymethyl-hydridesilsesquioxane (90% methyl-10% hydride), polyphenylsilsesquioxane (100% phenyl), polyphenyl-methylsilsesquioxane (90% phenyl-10% methyl), phenylsilsesquioxane-dimethylsiloxane copolymer (70% phenyl-30% dimethyl), polyphenyl-propylsilsesquioxane (70% phenyl and 30% propyl), polyphenyl-vinylsilsesquioxane (90% phenyl-10% vinyl), a T7 cube with polycyclohexylsilsesquioxanesilanol reactivity>90%, a T7 cube with polycyclohexylsilsesquioxanesilanol reactivity>>95%, a T8 cube for polycyclopentylsilsesquioxane (H substitution) hydrosilylation, a polycyclopentylsilsesquioxane (methacryloxy substitution) polymerizable T8 cube, a polycyclopentylsilsesquioxane (all H substitution) T8 cube, poly(2-chloroethyl)silsesquioxane, a T8 cube, and poly(2-chloroethyl)silsesquioxane.

Example of the titanium-based alkoxides includes tetraalkoxy titanium having an alkoxy group having 1 to 10 carbon atoms, such as tetraethoxy titanium; and titanium di-n-butoxide such as bis-2,4-pentanedionate.

Example of the aluminum-based alkoxides includes aluminum propoxide; aluminum dialkoxy diketonate such as aluminum di-sec-butoxide ethylacetoacetate; aluminum alkoxy bis-diketonate such as aluminum-sec-butoxide bis(ethylacetoacetate); aluminum tri-diketonate such as aluminum tri-2,4-pentanedionate; aluminum carboxylate such as aluminum acetate and aluminum acrylate.

Example of the zirconium-based alkoxides includes zirconium hydroxide; tetraalkoxy zirconium having an alkoxy group having 1 to 10 carbon atoms, such as tetra-n-propoxy zirconium; zirconium trialkoxy diketonate such as zirconium methacryloxy ethylacetoacetate tri-n-propoxide; zirconium dialkoxy diketonate such as zirconium di-iso-propoxide(bis-2,2,6,6-tetramethyl-3,5-heptadionate); zirconium tetraketonate such as zirconium tetra-2,4-pentanedionate; and zirconium carboxylate such as zirconyl dimethacrylate and zirconyl propionate.

Example of hafnium-based alkoxides includes tetraalkoxy hafnium having an alkoxy group having 1 to 10 carbon atoms, such as tetra-n-butyl hafnium; hafnium tetraketonate such as hafnium tetra-2,4-pentanedionate; and hafnium dialkoxy diketonate such as hafnium di-n-butoxide(bis-2,4-pentadionate).

Example of yttrium-based alkoxides includes trialkoxy yttrium having an alkoxy group having 1 to 10 carbon atoms such as yttrium triisopropoxide; yttrium tri-diketonate such as yttrium tri-2,4-pentadionate; and aluminum carboxylate such as yttrium acetate and yttrium acrylate.

Example of the organic filler includes divalent or more alcohol, phenol, carboxylic acid, amine, epoxy, latex or the like.

Example of the divalent or more alcohol or phenol includes divalent alcohol or phenol such as; ethylene glycol; diethylene glycol; triethylene glycol; polyethylene glycol and polypropylene glycol having a molecular weight of 200 to 35,000; 1,3-propanediol; 1,4-butanediol; 1,5-pentanediol; 1,6-hexanediol; 1,7-heptanediol; 1,8-octanediol; 1,9-nonanediol; 1,10-decanediol; 1,11-undecanediol; 1,12-dodecanediol; 1,4-dibenzyl alcohol; 1,4-dihydroxybenzene; 1,3-dihydroxybenzene; 4,4'-dihydroxybiphenyl; 2,2'-dihydroxybiphenyl; 4-hydroxyphenethyl alcohol; 3-(4-hydroxyphenyl)-1-propanol; hydroquinone bis(2-hydroxyethyl)ether; 4,4'-isopropylidene bis[2-(2,6-dibromophenoxy)ethanol]; 2-2(2-hydroxyetoxy)phenol; trans-9,10-dihydro-9,10-ethanoanthracene-11,12-dimethanol; 2-hydroxyphenethylalcohol; 3-hydroxyphenethylalcohol; 1-phenyl-1,2-ethanediol; 2-benzyloxy-1,3-propanediol; 3-phenoxy-1,2-propanediol; 1,5-dihydroxy-1,2,3,4-tetrahydronaphthalene; 2,2-biphenyldimethanol; 3,5-dihydroxybenzylalcohol; hydrobenzoin; α-naphtolbenzein; benzopinacol; 2-hydroxybenzylalcohol; 1,2-benzenedimethanol; 2,2-(1,2-phenylenedioxy)diethanol; 3-hydroxybenzylalcohol; 1,3-benzenedimethanol; α,α,α',α'-tetramethyl-1,3-benzenedimethanol; α,α,α', α'-tetrakis(trifluoromethyl)-1,3-benzenedimethanol; 1,4-benzenedimethanol; 3-aminobenzylalcohol; α,α,α', α'-tetramethyl-1,4-benzenedimethanol; α,α,α', α'-tetrakis(trifluoromethyl)-1,4-benzenedimethanol hydrate; phenylhydroquinone; 2,2',3,3',5,5',6,6'-octafluoro-4,4'-biphenol hydrate; bis(4-hydroxyphenyl)methane; bisphenol A; bisphenol P; bisphenol M; 4,4'-(hexafluoroisopropylidene)diphenol; 2,2-bis(4-hydroxy-3-methylphenyl)propane; 1,1,1-tris(4-hydroxyphenyl)ethane; hexestrol; tetrafluorohydroquinone; 1,1'-bi-2-naphthol; 4,4'-(9-fluorenylidene)diphenol; 2,7-dihydroxyfluorene; 4,4'-(1,3-adamantanezyl)diphenol; N,N'-bis(2-hydroxyethyl) oxixamide; 1,5-dihydroxynaphthalene; 1,6-dihydroxynaphthalene; 1,7-dihydroxynaphthalene; 2,3-dihydroxynaphthalene; 2,6-dihydroxynaphthalene; 2,7-dihydroxynaphthalene; polycarbonatediol having a molecular weight of 250 to 10,000, such as UC-CARB100, UH-CARB50, UH-CARB100, UH-CARB200, UH-CARB300, UM-CARB90(1/1) and UM-CARB90(3/1) manufactured by Ube Industries, Ltd.; polyetherdiol having a molecular weight of 250 to 10,000, such as polytetrahydrofran; polyesterdiol having a molecular weight of 250 to 10,000; polycaptolactonediol having a molecular weight of 250 to 10,000; hydroquinone; 4,8-bis(hydroxymethyl)-tricyclo[5.2.1.0(2,6)]decane; 1,4-cyclohexanemethanol; 4,4'-isopropylidenedicyclohexanol; 1,5-decalinediol; 2,2,3,3,4,4,5,5-octafluoro-1,6-hexanediol; 2,2,3,3,4,4,5,5,6,6,7,7,8,8,9,9-hexadecafluoro-1,10-decanediol; both terminals hydroxylated polydimethyl(phenyl)siloxane such as SILAPLANE FM-4411, SILAPLANE FM-4421 and SILAPLANE FM-4425 manufactured by Chisso Corporation; trimethylolethane; trivalent alcohol or phenol such as; trimethylolethane; trimethylolpropane; 2-(hydroxymethyl)-1,3-propanediol, 2-ethyl-2-(hydroxymethyl)-1,3-propanediol; 1,1,1-tris(hydroxymethyl)ethane; 1,2,4-butanetriol; glycerol; 1,3,5-trimethylolbenzene; 1,2,4-trihydroxybenzene; 1,3,5-trihydroxybenzene; pyrogallol; 1,3,5-tris(2-hydroxyethyl)cyanuric acid; tetravalent alcohol or phenol; such as pentaerythritol; di(trimethylolpropane); DL-xylose; D-xylose; L-xylose; 1,1,1,5,5,5-hexafluoro-2,2,4,4-pentanetetrol; 1,2,4,5-tetramethylolbenzene; calix[4]arene; pentavalent alcohol such as L-mannose and xylitol; alcohol or phenol of hexavalent or more such as dipentaerythritol, tripentaerythritol, inositol, α-cyclodextrin, β-cyclodextrin, γ-cyclodextrin, calix[6]arene and calyx[8]arene; or the like.

Example of carboxylic acid of divalent or more includes divalent carboxylic acid such as terephthalic acid; succinic acid; glutaric acid; adipic acid; 1,10-decanedicarboxylic acid; perfluoroadipic acid; perfluorosuberic acid; perfluorosebacic acid; 1,3-adamantanediacetic acid; 1,3-adamantanedicarboxylic acid; 1,4-cyclohexanedicarboxylic acid;

trans-1,4-cyclohexanedicarboxylic acid; 1,3-cyclohexanedicarboxylic acid; 1,2-cyclohexanecarboxylic acid; and both terminals carboxylated polydimethyl(phenyl)siloxane such as SILAPLANE FM-6611, SILAPLANE FM-6621 and SILAPLANE FM-6625 manufactured by Chisso Corporation; trivalent carboxylic acid such as trimesic acid; 1,2,3-benzenecarboxylic acid; 1,3,5-cyclohexanetricarboxylic acid; and 1,3,5-trimethyl-1,3,5-cyclohaxanetricarboxylic acid; tetravalent or more carboxylic acid such as 1,2,4,5-benzenetetracarboxylic acid; cyclobutanetetracarboxylic acid; and 1,2,3,4,5,6-hexacarboxylic acid.

Example of amine of divalent or more includes ethylenediamine; 1,3-diaminopropane; 1,2-diaminopropane; 1,4-diaminobutane; 1,5-diaminopentane; hexamethylenediamine; 1,7-diaminoheptane; 1,8-diaminooctane; 1,9-diaminononane; 1,10-diaminodecane; 1,11-diaminoundecane; 1,12-diaminododecane; 4,4'-diaminobenzanilide; bis(hexamethylene)triamine; 4-(aminomethyl)-1,8-octanediamine; tris(2-aminoethylamine); 5-amino-2,2,4-trimethyl-1-cyclopentanemethylamine; 5-amino-1,3,3-trimethylcyclohexanemethylamine; 4,4'-methylenebis(2-methylcyclohexylamine); 1,3-cyclohexanebis(methylamine); 4,4'-methylenebis(cyclohexylamine); 4,4'-ethylenedianiline; 3,3'-methylenedianiline; 4,4'-methylenedianiline; 4,4'-methylenebis(3-chloro-2,6-dimethylaniline); 4,4'-oxydianiline; 4,4'-ethylenedi-m-toluidine; o-tolidine; tetramethylbenzidine; 1,4-phenylenediamine; 1,2-phenylenediamine; 1,3-phenylenediamine; a functional resin monomer manufactured by Mitsui Chemicals, Inc., such as APB, APB-N, Bisaniline-P, Bisaniline-M and NBDA; 2,3-diaminotoluene; 4-chloro-1,2-phenylenediamine; 4,5-dichloro-1,2-phenylenediamine; 3,4-diaminotoluene; 4-methoxy-1,2-phenylenediamine; 2,6-diaminotoluene; 4,4'-diaminooctafluorobiphenyl; 3,3-diaminobenzidine; 4,5-dimethyl-1,2-phenylenediamine; 2,4-diaminotoluene; 3,5-diaminobenzylalcohol; 1,2,4,5-benzenetetramine; 4,4'-(hexafluoroisoproplidene)dianiline; 3,3'-dimethoxybenzidine; pararosaniline base; 3,3'-dimethylnaphthydine; 1,5-diaminonaphthalene; 2,7-diaminofluorene; 1,8-diaminonaphthalene; 9,10-diaminophenanthrene; 2,3-diaminonaphthalene; 3,7-diamino-2-methoxyfluorene; melamine; 2,4,6-triaminopyrimidine; 2-dimethyl-1,3-propanediamine; spermidine; spermine; diethylenetriamine; trans-1,4-diaminocyclohexane; both terminals aminated polydimethyl(phenyl)siloxane such as SILAPLANE FM-3311, SILAPLANE FM-3321 and SILAPLANE FM-3325 manufactured by Chisso Corporation; or the like.

Example of divalent or more epoxy includes a bisphenol A type epoxy resin; brominated bisphenol A epoxy resin; orthocresol novolac type epoxy resin; alicyclic epoxy resin; DCPD epoxy resin; polyphenol type epoxy resin such as a brominated novolac type, phenolnovolac type and bisphenyl type epoxy resin; polyglycidylamine type epoxy resin such as 1,3,5-tris(2,3-epoxypropyl)isocyanurate; alcohol type epoxy resin; ester type epoxy resin; or the like. The above epoxy compounds are described in p. 1126 to p. 1135 in "Chemical Products of 14705" published by The Chemical Daily Co., Ltd. Example of other divalent or more epoxy includes both terminals epoxylated polydimethyl(phenyl)siloxane such as SILAPLANE FM-5511, SILAPLANE FM-5521 and SILAPLANE FM-5525 manufactured by Chisso Corporation.

Latex includes products of JSR Cooperation, Nippon A & L, Inc., Zeon Cooperation or the like, and example includes trade name PYRATEX and Nipol series.

One kind of the raw material filler may be used alone, or two or more kinds may be mixed and used.

An example of the especially preferable raw material filler includes at least one selected from a group consisting of pentaerythritol, trimesic acid, dipentaerythritol, polytetrahydrofran, myo-inositol, polyethyleneglycol, tetraethoxysilane, methyltriethoxysilane, 1,4-phenylenediamine, hexamethylenediamine, 4,4'-biphenol, 1,3,5-tris(2-hydroxyethyl)cyanuric acid, N,N'-bis(hydroxyethyl)oxamide and bisphenol. The effect of the functional filler having these raw material fillers as constitutional components is proven in Examples described later.

The functional filler according to the present invention is preferably modified with 0.01 part by mass or more of polylactic acid (A) per 100 parts by mass of the raw material filler. In case that the polylactic acid (A) is 0.01 part by mass or more, the dispersibility in polylactic acid as a matrix polymer can be secured sufficiently, and the improvement effect of heat resistance, moldability and mechanical strength of the obtained resin composition is sufficient. The amount of the polylactic acid (A) is more preferably 0.1 part by mass or more per part by mass of the raw material filler, and more preferably 0.2 to 2000 parts by mass.

The hydroxy group or the carboxyl group of the end of the polylactic acid which modifies the surface or end of the raw material filler may be protected. More specifically, the hydroxy group or the carboxyl group is preferably esterified, urethanized or etherified. In particular, esterification is preferable. With such protection, thermal stability of the functional filler, the resin composition and the like of the present invention can be improved.

Sulfonic acid esterification and phosphoric acid esterification are also included in the above-described esterification other than carboxylic acid esterification. Example of phosphonic acid esters includes a monoester, diester and triester.

The above-described hydroxy group can be protected by esterification, urethanization or etherification. The esterification can be performed using derivative such as organic acid: R—$CO_2$H and acid anhydride thereof or the like. The urethanization can be performed using carbamic acid derivative such as RNHCOCL or the like. The etherification can be performed using halogen compound such as R—Cl or the like. Further, the above-described carboxyl group can be protected by esterification. The esterification can be performed with R—OH or the like. A method known by those skilled in the art can be applied as a specific condition of the esterification and the like. For example, the end can be protected and modified by bonding polylactic acid to a raw material filler in a reactor and then reacting an acid anhydride, diisocyanate or the like without isolating, or by isolating and then reacting diisocyanate or the like in a kneader and a bi-axial extruder.

The above-described R is not especially limited as long as it is a normal organic group. Example thereof can include an alkyl group having 1 to 12 carbon atoms such as methyl, ethyl, propyl, isopropyl, n-butyl, iso-butyl, sec-butyl, tert-butyl, n-pentyl, n-hexyl, n-heptyl, n-octyl, n-nonyl, n-decyl, n-undecyl and n-dodecyl; a substituted alkyl group having 1 to 12 carbon atoms such as trifluoromethyl; an alkylene group having 2 to 12 carbon atoms such as ethylene; a cycloalkyl group having 3 to 10 carbon atoms such as cyclohexyl; and an aryl group such as phenyl.

Specific example of a reagent for the above-described protection includes acetic anhydride, acetic acid, acetic acid chloride, propionic anhydride, propionic acid, butyric anhydride, butyric acid, succinic anhydride, succinic acid, phthalic anhydride, phthalic acid, adipic acid, camphonic acid, cyclohexane diacetic acid, cyclopentane diacetic acid, adamantane dicarboxylic acid, norbornane dicarboxylic anhydride, norbornane dicarboxylic acid, norbornene dicarboxylic acid anhydride, norbornene carboxylic acid, 2,6-naphthalene dicarboxylic acid, 1,4-naphthalene dicarboxylic acid, 1,5-naphthalene dicarboxylic acid, trifluoroacetic anhydride, trifluoroacetic acid, pentafluoropropionic anhydride, heptafluorobutylic anhydride, heptafluorobutyric acid, benzoic anhydride, benzoic acid, trifluoromethanesulfonic anhydride, trifluoromethanesulfonic acid, ethylisocyanate, propylisocyanate, sec-butylisocyanate, tert-butylisocyanate, pentylisocyanate, hexylisocyanate, heptylisocyanate, octylisocyanate, cyclohexylisocyanate, isophoronediisocyanate, phenylisocyanate, toluenediisocyanate, toluene-2,4-diisocyanate, toluene-2,6-diisocyanate, 1,3-phenylenediisocyanate, 1,3-bis(isocyanatemethyl)benzene, 1,3-bis(isocyanate-1-methylethyl)benzene, 4,4'-methylenebis(phenyl)socyanate), 1,4-phenylenediisocyanate, 1-chloromethyl-2,4-diisocyanatebenzene, 4,4'-methylenebis(2,6-diphenylisocyanate), 4,4'-oxybis(phenyl)socyanate), 1,4-diisocyanatebutane, 1,6-diisocyanatehexane, 1,8-diisocyanateoctane, 1,12-diisocyanatedodecane, 1,5-diisocyanate-2-methylpentane, trimethyl-1,6-diisocyanatehexane, 1,3-bis(isocyanatemethyl) cyclohexane, trans-1,4-cyclohexylenediisocyanate, 4,4'-methylenebis(cyclohexylisocyanate), isophoronediisocyanate, RIKACID (registered trademark) TH, RIKACID HT-1A, RIKACID HH, RIKACID MH-700, RIKACID MT-500TZ, and RIKACID HNA-100 manufactured by New Japan Chemical Co., Ltd., and these mixtures.

In case of using anhydride of divalent acid such as phthalic anhydride as a reagent for protection, it is considered that the reagent reacts with two terminal hydroxy groups of polylactic acid to bond two polylactic acids. However, it is also possible that the anhydride reacts with only one terminal hydroxyl group of the polylactic acid and a carboxyl group originated from the anhydride remains.

A method of modifying the raw material filler with the above-described polylactic acid (A) is not especially limited. However, for example, a method of performing dehydration-polymerization of lactic acid and/or a ring-opening polymerization of lactide in the presence of the raw material filler is exemplified. Moreover, a method described in Japanese publication of patent application Nos. Hei 9-143253 and Hei 7-206851 can be used in these dehydrating polymerization and ring-opening polymerization methods.

More specifically, the functional filler of the present invention can be produced with a method including the steps of mixing lactic acid solution and/or lactide solution or lactic acid melt and/or lactide melt with the raw material filler; and polymerizing the lactic acid and/or lactide to modify the surface or end of the raw material filler with polylactic acid. Such method of producing the functional filler is also one of the present invention. Hereinafter, the condition and the like of each step will be described.

First, a solution of lactic acid and/or lactide or a melt of lactic acid and/or lactide is mixed with the raw material filler. Toluene can be preferably used as a solvent of the solution. In the next polymerization step, the reaction is carried out while water generated by the polymerization is removed. In such a reaction, benzene or toluene can be generally used. However, since the boiling point of benzene is relatively low and there is a fear that the reaction does not proceed well, toluene is preferably used. Further, since the melting point of lactic acid is about 53° C. and the melting point of lactide is 124° C., the melt can be easily produced by bringing the temperature to the melting points or more. The mixing method is not especially limited, and the raw material filler may be added and mixed to the above-described solution or melt, or the raw material filler may be mixed with lactic acid or the like and then the solvent may be added, or lactic acid or the like may be melted.

In case that the raw material filler does not have a functional group capable of being bonded to lactic acid or polylactic acid on the surface or end, the functional group may be introduced using a known method. Specifically, there is a method of mixing alkoxysilane in which at least one alkoxyl group is substituted with a functional group such as an aminoalkyl group and an epoxyalkyl group with the raw material filler, and modifying the surface of the raw material filler while alkoxysilane is polymerized.

The ratio of lactic acid or the like and the raw material filler may be adjusted appropriately depending on the amount of polylactic acid (A) to be bonded to the raw material filler, that is the number and the each molecular weight of the polylactic acid (A) to be bonded, and whether polylactic acid which is not bonded to the raw material filler is made to remain or not. Further, the ratio is adjusted depending on the type of the raw material filler. For example, in case of divalent alcohol having only two functional groups capable of being bonded to polylactic acid, the amount of lactic acid and the like should be relatively less. On the other hand, in case of using a raw material filler capable of bonding a lot of polylactic acid and the like on the surface such as a surface modified silica, the amount of lactic acid and the like may be relatively more. Further, though the concentration of the solution of lactic acid and the like is not especially limited, for example, the concentration can be made to be about 40 to 80% by mass. In the stage of this step, a completed solution is not necessarily used, and a suspension in which a part of lactic acid and the like is not dissolved.

Next, the temperature of the mixed liquid obtained in the mixing step is increased to promote the polymerization reaction. At the same time as the polymerization of lactic acid, a polylactic acid is bonded to a reactive group on the surface or end of the raw material filler. At this time, a general polymerization catalyst may be added. However, considering the possibility of not performing the purification of the functional filler, it is preferable not to use a catalyst. The polymerization reaction proceeds by increasing the temperature to about 100 to 250° C. Further, the polymerization can proceed even more by introducing inert gas such as argon gas and nitrogen gas, or removing water in the reaction system. The reaction time can be, but not especially limited to, about 5 to 20 hours. Moreover, by adjusting the reaction temperature and the reaction time depending on the reaction substrate, the degree of polymerization of the polylactic acid can be adjusted.

Other than the above-described production method, polylactic acid to be bonded is synthesized separately, and then the polylactic acid can be bonded to the raw material filler. This method is effective for the case of bonding a special polylactic acid such as a block copolymer. Before polylactic acid is bonded to the raw material filler, the terminal hydroxy group or the terminal carboxyl group of the polylactic acid may be activated.

After completion of the reaction, the reaction mixture is dissolved into chloroform, dioxane or the like, and then the mixture may be refined by reprecipitating the functional filler with priority by gradually adding methanol or ethanol which is a poor solvent of the polylactic acid and collecting this precipitant. However, the mixture may be used as it is as the mixture with a non-bonded polylactic acid.

Further, after purification of the functional filler, an increase of the molecular weight may be attempted by performing further solid-phase polymerization by heating under reduced pressure in a solid state depending on necessity.

In the above-described production method, the functional filler composition containing polylactic acid which is not bonded to the raw material slurry can be produced by using an excess amount of lactic acid and/or lactide to the raw material filler and not performing more purification than necessary. Such a functional filler composition and such a production method are one embodiment of the present invention.

The functional filler composition of the present invention contains the above-described functional filler and a non-bonded polylactic acid produced during production of the functional filler. Since such resin composition can be produced by omitting a purification step, the composition has an advantage in the aspect of cost.

In case of protecting a hydroxy group or a carboxyl group at the end of polylactic acid which modifies the surface or end of the raw material filler in the functional filler composition, at least one part of the end of the non-bonded polylactic acid is also assumed to be protected the same. Such a functional filler composition is included in the scope of the present invention.

The functional filler composition of the present invention is characterized in including the above functional filler and polylactic acid as a matrix polymer, in which at least one part of the polylactic acid interacts with polylactic acid which modifies the surface or end of the functional filler. Since polylactic acid as a matrix polymer can interact with polylactic acid which is bonded to the functional filler in this resin composition, the functional filler cross-links multiple matrix polymers, and heat resistance, strength or the like of the composition material can be remarkably increased. Hereinafter, polylactic acid which is a matrix polymer is sometimes referred to as "polylactic acid (B)".

At least a part of Polylactic acid (B) as a matrix polymer can interact with polylactic acid (A) bonding to the functional filler. When at least one part of polylactic acid (B) can interact with polylactic acid (A), multiple polylactic acids (B) is crosslinked by polylactic acid (A), and heat resistance or the like can be improved. For expecting even more improvement of the effect, polylactic acid (B) showing a strong interaction with polylactic acid (A) is preferably used. For example, in case that polylactic acid (A) is poly-L-lactic acid, poly-D-lactic acid is preferably used as polylactic acid (B). Further, a mixture of polylactic acid may be used as polylactic acid (B), and in this case, a functional filler may be used in which the surface or end is modified with the mixture of polylactic acid.

Poly-L-lactic acid and poly-D-lactic acid can be obtained by directly condensating L-lactic acid or D-lactic acid obtained with a fermentation method from a plant raw material, for example, as shown in Japanese publication of patent application No Hei 9-143253. Further, as shown in Japanese publication of patent application No. Hei 7-206851, a similar poly-L-lactic acid and poly-D-lactic acid can be obtained also by performing ring-opening polymerization on a cyclic dimer, i.e. D-lactide or L-lactide, obtained by thermally decomposing a low molecular condensation product of lactic acid, i.e. lactic acid oligomer.

For the preferred molecular weight of the above-described polylactic acid (B) used in the present invention, the best value is determined by the object, usage, necessary performance or molding method. The number average molecular weight (Mn) in terms of polystyrene is 50,000 or more, preferably 100,000 or more, and more preferably 120,000 to 500,000. The number average molecular weight of the present invention is measured with GPC (gel permeation chromatography) with an 1,1,1,3,3,3-hexafluoro-2-isopropanol solvent. Moreover, the weight average molecular weight of polylactic acid is normally 1.1 to 5×Mn, and preferably 1.1 to 3×Mn. However, in special uses such as the use of foaming and inflation film, polylactic acid having molecular weight other than this range can be also sufficiently used.

The non-bonded polylactic acid produced during production of the functional filler may be blended in the resin composition of the present invention. This polylactic acid may be added other than the functional filler and the matrix polymer of the present invention, however, the polylactic acid is included in the above-described functional filler composition of the present invention. Therefore, in case that the functional filler and the matrix polymer of the present invention are mixed, the polylactic acid is naturally blended. Hereinafter, the non-bonded polylactic acid produced at the production of the functional filler is sometimes referred to as "polylactic acid (C)".

In case that at least one part of polylactic acid (C) interacts with polylactic acid (B), for example, in case that the polylactic acid (A) and polylactic acid (C) are poly-L-lactic acid and the polylactic acid (B) is poly-D-lactic acid, or in case that polylactic acid (A) and polylactic acid (C) are poly-D-lactic acid and polylactic acid (B) is poly-L-lactic acid, at least one part of polylactic acid (A) and/or polylactic acid (C) and the above-described polylactic acid (B) can form a stereo complex.

Whether there is a stereo complex of the functional filler of the present invention and polylactic acid (B) as a matrix polymer or polylactic acid (B) and polylactic acid (C) can be determined easily in that a new melting point (Tm2) is shown at a higher temperature than a melting point (Tm1) of poly-L-lactic acid or poly-D-lactic acid. Heat of diffusion (ΔHm2) at the melting point (Tm2) is proportional to the amount of poly-D-lactic acid in poly-L-lactic acid or the amount of poly-L-lactic acid in poly-D-lactic acid. From this, quantification of the stereo complex amount in poly-L-lactic acid or the stereo complex amount in poly-D-lactic acid becomes possible.

The above-described functional filler and/or the functional filler composition in the resin composition of the present invention is preferably 0.01 part by mass or more per 100 parts by mass of matrix polymer. When the amount is 0.01 part by mass or more, the physical properties improving effect by the addition of the functional filler can be secured sufficiently. It is more preferably 0.5 part by mass or more, and further preferably 1 part by mass or more. On the other hand, when the functional filler is added excessively, there is a case that the strength of the resin composition rather decreases. Therefore, the added amount of the functional filler is preferably 50 parts by mass or less and more preferably 30 parts by mass or less per 100 parts by mass of matrix polymer.

The heat resistance of the resin composition of the present invention is preferably the heat resistance in which the deformation amount is less than 10 mm in a heat sag test of 110° C. or more. Here, the above-described heat sag test is performed by heating for 1 hour at a temperature of 110° C. or more according to JIS K7195. A test piece is produced by cutting out the resin composition which is molded with a hot press into a prescribed size with a hot cutter. Here, good heat resistance refers to the case that the deformation amount is 10 mm or less. More preferred heat resistance refers to a small deformation amount in a heat sag test with higher temperature. When the deformation amount at 110° C. or more is 10 mm or more, heat resistance is insufficient and the composition becomes inappropriate depending on the use. The more preferred heat resistance is that the deformation amount is less than 10 mm in a heat sag test at 120° C. or more, and further preferably less than 10 mm at 130° C. or more.

The resin composition of the present invention preferably has high transparency. The light transmittance at 550 nm when the resin composition of the present invention is molded into a sheet sample of 0.2 mm thickness is preferably 70% or more, and more preferably 75% or more.

Since the homogenously dispersed functional filler functions as a nucleating agent in the resin composition of the present invention, the crystallization speed of the resin composition becomes fast, and molding speed, stretching temperature and stretching ratio can be improved. Therefore, physical properties and moldability of the obtained molded product can be improved, and thus applications can be expanded. Further, since a spherical-shaped crystal size is small even in case of crystallization, the transparency is maintained, and brittleness of the molded body is improved without distraction at the interface or the spherical-shaped crystal. In the resin composition of the present invention, the degree of crystallization is preferably 25% or more. When the degree of crystallization is less than 25%, heat resistance and mechanical strength of the molded body is insufficient depending on the use, since heat resistance and the modulus of elasticity are low. More preferably the degree is 30% or more, and further preferably 35 to 80%. The degree of crystallization of the resin composition can be measured using a differential scanning calorimeter such as Rigaku DSC8230 manufactured by Rigaku Cooperation.

The resin composition of the present invention can be made into a heat resistant flame-retardant material by kneading various flame-retardant agents. Example of the flame retardant agents includes a halogen antimony-based flame-retardant agent, an environment-responsive type flame-retardant agent or the like. The environment-responsive type flame-retardant agent is mainly used.

Example of the environment-responsive type flame-retardant agent includes a silicone-based flame-retardant agent, a phosphorus-based flame-retardant agent, a metal hydroxide-based flame-retardant agent, a nitrogen-based flame-retardant agent or the like.

Example of the silicone-based flame-retardant agent includes SZ6018 which is phenylsilicone manufactured by Dow Corning Cooperation, DC4-7081 which is methacryl group-containing polymethylsiloxane manufactured by Dow Corning Cooperation, MB50-315 which is polycarbonate+polydimethylsiloxane manufactured by Dow Corning Cooperation, X40-9805 which is methylphenyl-based silicone manufactured by Shin-Etsu Chemical Co., Ltd., XC99-B5664 which is phenylsilicone manufactured by GE Toshiba Silicone Co., Ltd. or the like.

Example of the phosphorus-based flame-retardant agent includes an AP-based flame-retardant agent, an OP-based flame-retardant agent, a TPP-based flame-retardant sold from Clarient, Inc.; aromatic condensated phosphoric acid ester such as PX-200 manufactured by Daihachi Chemical Industry Co., Ltd.; ammonium polyphosphate such as Fire Cut FCP730 manufactured by Suzuhiro Chemical Co., Ltd.; triphenylphosphate sold from Daihachi Chemical Industry Co., Ltd. or the like.

Example of the metal hydroxide-based flame-retardant agent includes BF01ST (average partiparticle size: 1 μm, KISMER 5A) which is aluminum hydroxide manufactured by Nippon Light Metal Co., Ltd. or the like.

Example of the nitrogen-based flame-retardant agent includes Stabaxol I which is a mixture having bis(dipropylphenyl)carbodiimide as a main component manufactured by Rhein Chemie; Stabaxol P which is a mixture of aromatic monocarbodiimide (95%) and silica (5%) manufactured by Rhein Chemie; melamine compounds such as melamine cyanurate, dimelamine phosphate and melamine borate such as MC-440 manufactured by Nissan Chemical Industries, Ltd.; guanidine compound such as guanidine sulfamate, guanidine phosphate and guanylurea phosphate, such as Apinone series manufactured by Sanwa Chemical Co., Ltd. and Melar series manufactured by Monsanto Company or the like.

In the resin composition of the present invention, various characteristics such as mechanical characteristics and a gas barrier characteristic can be improved further by kneading the raw material filler of the functional filler of the present invention.

By adding the functional filler of the present invention, the dispersibility or compatibility of the matrix polymer with other polymers such as polycarbonate, polyethyleneterephthalate and polypropylene, additives such as dye or the like can be improved.

The production method of the resin composition of the present invention is not especially limited. However, the resin composition can be produced with a method including the steps of mixing lactic acid and/or lactide solution or lactic acid melt and/or lactide melt with the raw material filler; polymerizing the lactic acid and/or latcide to modify the surface or end of the raw material filler with polylactic acid to obtain the functional filler; and mixing the functional filler with the polylactic acid as a matrix polymer at least partly interacting with polylactic acid modifying the surface or end of the functional filler. Such a production method of the resin composition is also one embodiment of the present invention.

In the above-described production method, the functional filler and the matrix polymer may be mixed in a solvent. However, since a drying step is necessary and the solvent itself is harmful to a living body, the melt mixing is preferably performed at a temperature of the melting point of at least one of the components or more.

In the production method of the resin composition of the present invention, a normal method for removing a solvent can be adapted as a method of removing the solvent used in the production of the functional filler. Specifically, a method of removing by heating under atmosphere or reduced pressure during mixing in a laboratory plastomill or a biaxial extruder or the like is preferably used.

A molded body including the resin composition of the present invention is also one embodiment of the present invention. Example of such a molded body includes a molded body by injection molding method, a molded body by extrusion molding method, a molded body by inflation molding method, a molded body by blow molding method, a molded body by transfer molding method, a molded body by pressure compressed molding method, a fiber structured product and a molded body by molding method used in a method of a normal plastic molding. Though melt characteristics and solidifying and crystallization characteristics are important elements when the resin composition is applied to each of these molding methods, optimization can be performed easily to any of the molding methods of the present invention.

EXAMPLES

Hereinafter, the present invention will be described in more detail by showing Examples. However, the present invention is not limited to these Examples.

Production Example 1

Production of Functional Filler Composition in which the Surface of the Filler is Treated with Low Molecular Weight Polylactic Acid

[1] Production of Surface-aminated silica, and Production of D-form-modified Functional Filler Composition Using the Silica (1) Production of Surface-aminated Silica SYLOSPHERE (registered trademark) C-1504 (average partiparticle size: 4 μm, 56 g) which was a spherical silica manufactured by Fuji Silysia Chemical Ltd., was dispersed into ethanol (1.5 l) in which water (75 ml) was added. Then, 3-aminopropyltriethoxysilane (15 g) was added, and the resulting mixture was stirred at room temperature for 24 hours.

The silica partiparticles were filtered under reduced pressure, particleaned with ethanol, and then dried at 100° C. to obtain surface-aminated silica (62 g). The obtained surface-aminated silica was almost transparent. This shows that the surface of the spherical silica is aminated, and mutual coagulation of silica is eliminated.

(2) Production of D-Form-modified Functional Filler composition <Sample 1>

The surface-aminated silica (5 g) obtained in (1) was dispersed into D-lactic acid (manufactured by PURAC, 90% by mass solution, 50 g), and the resulting solution was stirred overnight at 140° C. under argon bubbling to perform dehydration polymerization.

After completion of the reaction, a fluid polymer was transferred to a Teflon (registered trademark) container, and then cooled and solidified to obtain about 30 g of yellowish brown and almost transparent D-form-modified functional filler composition.

The fact that the obtained D-form-modified functional filler composition is almost transparent shows that coagulation of silica partiparticles is eliminated by bonding poly-D-lactic acid on the surface of the silica partiparticles.

(3) Production of D-Form-modified Functional Filler composition <Sample 2>

The surface-aminated silica (10 g) obtained in (1) was dispersed into D-lactic acid (manufactured by PURAC, 90% by mass solution, 50 g), and the resulting solution was stirred overnight at 140° C. under argon bubbling to perform dehydration polymerization.

After completion of the reaction, a fluid polymer was transferred to a Teflon (registered trademark) container, and then cooled and solidified to obtain about 34 g of yellowish brown and almost transparent D-form-modified functional filler composition. The fact that the obtained D-form-modified functional filler composition is almost transparent shows that coagulation of silica partiparticles is eliminated by bonding poly-D-lactic acid on the surface of the silica partiparticles.

(4) Production of D-form-modified functional filler composition <Sample 3>

The surface-aminated silica (40 g) obtained in (1) and D-lactic acid (manufactured by PURAC, 90% by mass solution, 80 g) was dissolved and dispersed into toluene (120 ml), and water was removed under reflux using a water measuring tube under an argon atmosphere to perform dehydration polymerization to obtain yellowish brown and almost transparent D-form-modified functional filler composition. The fact that the obtained D-form-modified functional filler composition is almost transparent shows that coagulation of silica partiparticles is eliminated by bonding poly-D-lactic acid on the surface of the silica partiparticles.

The toluene solution of this D-form-modified functional filler composition was used in the next experiment as it was.

[2] Production of D-form-modified functional filler composition <Sample 4>

A methanol suspension (16.5 g) of silica sol manufactured by Nissan Chemical Co., Ltd., was dispersed into D-lactic acid (manufactured by PURAC, 90% by mass solution, 50 g), and the resulting solution was stirred overnight at 140° C. under argon bubbling to perform dehydration polymerization.

After completion of the reaction, about 27 g of colorless and transparent D-form-modified functional filler composition was obtained by cooling and solidifying and scraping out the solid with a spatula.

[3] Production of surface-epoxidated silica, and production of a D-form-modified functional filler composition using the silica (1) Production Method of Surface-epoxidated Silica SYLOSPHERE C-1504 (average partiparticle size: 4 μm, 52 g) which was a spherical silica manufactured by Fuji Silysia Chemical Ltd., was dispersed into ethanol (1.5 l) in which water (75 ml) was added, and then pH was adjusted to about 4 by adding acetic acid. Next, 3-glycideoxypropyltrimethoxysillane (16 g) was added, and the resulting mixture was stirred at room temperature for 24 hours.

The silica partiparticles were filtered under reduced pressure, particleaned with ethanol, and then dried at 100° C. to obtain surface-epoxidated silica (54 g).

(2) Production of D-form-modified Functional Filler Composition <Sample 5>

The surface-epoxidated silica (10 g) obtained in (1) was dispersed into D-lactic acid (manufactured by PURAC, 90% by mass solution, 50 g), and the resulting solution was stirred overnight at 140° C. under argon bubbling to perform dehydration polymerization.

After completion of the reaction, a fluid polymer was transferred to a Teflon (registered trademark) container, and then cooled and solidified to obtain about 30 g of colorless and almost transparent D-form-modified functional filler composition. The fact that the obtained D-form-modified functional filler composition is almost transparent shows that silica partiparticles are dispersed into poly-D-lactic acid in a state of almost primary partiparticles.

[4] Production of D-form-modified functional filler composition <Sample 6>

KUNIPIA P (10 g) which was montmorillonite manufactured by Kunimine Industries Co., Ltd., was dispersed into D-lactic acid (manufactured by PURAC, 90% by mass solution, 100 g), and the resulting solution was stirred overnight at 140° C. under argon bubbling to perform dehydration polymerization.

After completion of the reaction, a fluid polymer was transferred to a Teflon (registered trademark) container, and then cooled and solidified to obtain about 65 g of grey green D-form-modified functional filler composition.

[5] Production of D-form-modified Functional Filler Composition <Sample 7>

AEROSIL SILICA 50 (5 g) which was a silica partiparticle manufactured by Nippon Aerosil Co., Ltd., and D-lactic acid (manufactured by PURAC, 90% by mass solution, 50 g) were mixed. In the beginning of the reaction, the mixture became solid by absorption of D-lactic acid by Aerosil and was not homogenous. However, when the mixture was reacted at 140° C. under argon bubbling, the mixture gradually became a homogenous solution. Further, dehydration polymerization was performed under stirring overnight.

After completion of the reaction, a fluid polymer was transferred to a Teflon (registered trademark) container, and then cooled and solidified to obtain about 32 g of colorless and almost transparent D-form-modified functional filler composition. The fact that the obtained D-form-modified functional filler composition is almost transparent shows that coagulation of silica partiparticles is eliminated by bonding poly-D-lactic acid on the surface of the silica partiparticles.

[6] Production of L-form-modified Functional Filler Composition <Sample 8>

AEROSIL SILICA 50 (5 g) which was a silica partiparticle manufactured by Nippon Aerosil Co., Ltd., and L-lactic acid (manufactured by Nacalai Tesque, 90% by mass solution, 50 g) were mixed. In the beginning of the reaction, the mixture became solid by the absorption of D-lactic acid by AEROSIL and was not homogenous. However, when the mixture was reacted at 140° C. under argon bubbling, the mixture gradually became a homogenous solution. Further, dehydration polymerization was performed under stirring overnight.

After completion of the reaction, a fluid polymer was transferred to a Teflon (registered trademark) container, and then cooled and solidified to obtain about 32 g of colorless and almost transparent L-form-modified functional filler composition. The fact that the obtained L-form-modified functional filler composition is almost transparent shows that silica partiparticles are dispersed into poly-L-lactic acid in a state of almost primary partiparticles.

[7] Production of D-form-modified Functional Filler Composition <Sample 9>

Fiber hydroxyapatite (3.7 g) manufactured by Ube Material Industries, Ltd., was dispersed into D-lactic acid (manufactured by PURAC, 90% by mass solution, 37 g), and the resulting solution was stirred overnight at 140° C. under argon bubbling to perform dehydration polymerization.

After completion of the reaction, a fluid polymer was transferred to a Teflon (registered trademark) container, and then cooled and solidified to obtain about 27 g of white D-form-modified functional filler composition.

[8] Production of D-form-modified Functional Filler Composition <Sample 10>

A pulp sheet (9 g) was broke up into fibers with a mixer and water was partially remove to obtain 40 g of lump. A mixture of the lump, D-lactic acid (manufactured by PURAC, 90% by mass solution, 50 g) and water (50 g) was stirred overnight at 140° C. under argon bubbling to perform dehydration polymerization.

After completion of the reaction, the mixture was cooled and solidified, and about 33 g of yellowish brown D-form-modified functional filler composition was obtained by scraping with a spatula.

[9] Production of D-form-modified Functional Filler Composition <Sample 11>

Pentaerythritol (2.5 g) was dispersed into D-lactic acid (manufactured by PURAC, 90% by mass solution, 73 g), and the resulting mixture was stirred for 2 days at 140° C. under argon bubbling to perform dehydration polymerization.

After completion of the reaction, a fluid polymer was transferred to a Teflon (registered trademark) container, and then cooled and solidified to obtain about 69 g of colorless and transparent D-form-modified functional filler composition.

[10] Production of D-form-modified Functional Filler Composition <Sample 12>

Pentaerythritol (5 g) was dissolved into D-lactic acid (manufactured by PURAC, 90% by mass solution, 73 g), and the resulting solution was stirred for 2 days at 140° C. under argon bubbling to perform dehydration polymerization.

After completion of the reaction, a fluid polymer was transferred to a Teflon (registered trademark) container, and then cooled and solidified to obtain about 66 g of colorless and transparent D-form-modified functional filler composition.

[11] Production of D-form-modified Functional Filler Composition <Sample 13>

Trimesic acid (2.5 g) was dispersed into D-lactic acid (manufactured by PURAC, 90% by mass solution, 71 g), and the resulting mixture was stirred overnight at 140° C. under argon bubbling to perform dehydration polymerization.

After completion of the reaction, a fluid polymer was transferred to a Teflon (registered trademark) container, and then cooled and solidified to obtain about 70 g of white D-form-modified functional filler composition.

[12] Production of D-form-modified Functional Filler Composition <Sample 14>

Dipentaerythritol (5 g) was dissolved into D-lactic acid (manufactured by PURAC, 90% by mass solution, 108 g), and the resulting solution was stirred overnight at 140° C. under argon bubbling to perform dehydration polymerization.

After completion of the reaction, a fluid polymer was transferred to a Teflon (registered trademark) container, and then cooled and solidified to obtain about 73 g of colorless and transparent D-form-modified functional filler composition.

[13] Production of D-form-modified Functional Filler Composition <Sample 15>

AEROSIL SILICA 300 (30 g) which was a silica nanopartiparticle manufactured by Nippon Aerosil Co., Ltd., was mixed with D-lactic acid (manufactured by PURAC, 90% by mass solution, 300 g). In the beginning of the reaction, the mixture became solid by absorption of D-lactic acid by Aerosil and was not homogenous. However, when the mixture was reacted at 140° C. under argon bubbling, the mixture gradually became a homogenous solution. Further, dehydration polymerization was performed under stirring overnight.

After completion of the reaction, a fluid polymer was transferred to a Teflon (registered trademark) container, and then cooled and solidified to obtain about 220 g of colorless and almost transparent D-form-modified functional filler composition.

[14] Production of D-form-modifed Functional Filler Composition <Sample 16>

PILATEX-LB (a 38.9% by mass solution, 100 g) which was latex manufactured by Nippon A and L Co., Ltd., was mixed with D-lactic acid (manufactured by PURAC, 90% by mass solution, 300 g), and the resulting mixture was stirred overnight at 130° C. under argon bubbling and further stirred overnight at 160° C. to perform dehydration polymerization. At the polymerization, generation of foam was intense and a half or more of the polymerization product flowed out).

After completion of the reaction, a fluid polymer was transferred to a Teflon (registered trademark) container, and then cooled and solidified to obtain about 70 g of brown and semi-transparent D-form-modified functional filler composition.

[15] Production of D-form-modifed Functional Filler Composition <Sample 17>

Polytetrahydrofran (molecular weight 650, 23.1 g) was dissolved into D-lactic acid (manufactured by PURAC, 90% by mass solution, 215 g), and the resulting solution was stirred overnight at 130° C. under argon bubbling and further stirred overnight at 160° C. to perform dehydration polymerization.

After completion of the reaction, a fluid polymer was transferred to a Teflon (registered trademark) container, and then cooled and solidified to obtain about 145 g of colorless and transparent D-form-modified functional filler composition.

[16] Production of D-form-modified Functional Filler Composition <Sample 18>

Polytetrahydrof ran (molecular weight: 250, 17.8 g) was dissolved into D-lactic acid (manufactured by PURAC, 90% by mass solution, 427 g), and the resulting solution was stirred overnight at 130° C. under argon bubbling and further stirred overnight at 160° C. to perform dehydration polymerization.

After completion of the reaction, a fluid polymer was transferred to a Teflon (registered trademark) container, and then cooled and solidified to obtain about 325 g of colorless and transparent D-form-modified functional filler composition.

[17] Production of D-form-modifed Functional Filler Composition <Sample 19>

Myo-inositol (10.0 g) was dissolved into D-lactic acid (manufactured by PURAC, 90% by mass solution, 1000 g), and the resulting solution was stirred overnight at 130° C. under argon bubbling and further stirred overnight at 160° C. to perform dehydration polymerization.

After completion of the reaction, a fluid polymer was transferred to a Teflon (registered trademark) container, and then cooled and solidified to obtain about 750 g of almost colorless and transparent D-form-modified functional filler composition.

[18] Production of D-form-modifed Functional Filler Composition <Sample 20>

Polyethylene glycol (molecular weight: 600, 90 g) was dissolved into D-lactic acid (manufactured by PURAC, 90% by mass solution, 900 g), and the resulting solution was stirred overnight at 130° C. under argon bubbling and further stirred overnight at 160° C. to perform dehydration polymerization.

After completion of the reaction, a fluid polymer was transferred to a Teflon (registered trademark) container, and then cooled and solidified to obtain about 790 g of colorless and transparent D-form-modified functional filler composition.

[19] Production of D-form-modifed Functional Filler Composition <Sample 21>

Tetraethoxysilane (50.0 g) was dissolved into D-lactic acid (manufactured by PURAC, 90% by mass solution, 450 g), and the resulting solution was stirred overnight at 130° C. under argon bubbling and further stirred overnight at 160° C. to perform dehydration polymerization.

After completion of the reaction, a fluid polymer was transferred to a Teflon (registered trademark) container, and then cooled and solidified to obtain about 250 g of colorless and transparent D-form-modified functional filler composition.

[20] Production of D-form-modifed Functional Filler Composition <Sample 22>

Methyltriethoxysilane (37.5 g) was dissolved into D-lactic acid (manufactured by PURAC, 90% by mass solution, 150 g), and the resulting solution was stirred overnight at 130° C. under argon bubbling and further stirred overnight at 160° C. to perform dehydration polymerization.

After completion of the reaction, a fluid polymer was transferred to a Teflon (registered trademark) container, and then cooled and solidified to obtain about 95 g of white D-form-modified functional filler composition.

[21] Production of D-form-modifed Functional Filler Composition <Sample 23>

SILA-ACE S330 (61 g) which was 3-aminopropyltrialkoxysilane manufactured by Chisso Cooperation was dissolved into D-lactic acid (manufactured by PURAC, 90% by mass solution, 830 g), and the resulting solution was stirred overnight at 130° C. under argon bubbling and further stirred overnight at 160° C. to perform dehydration polymerization.

After completion of the reaction, a fluid polymer was transferred to a Teflon (registered trademark) container, and then cooled and solidified to obtain about 600 g of yellow and transparent D-form-modified functional filler composition.

[22] Production of D-form-modifed Functional Filler Composition <Sample 24>

SILA-ACE S510 (35 g) which was 3-glycidoxypropyltrialkoxysilane manufactured by Chisso Cooperation was dissolved into D-lactic acid (manufactured by PURAC, 90% by mass solution, 900 g), and the resulting solution was stirred overnight at 130° C. under argon bubbling and further stirred overnight at 160° C. to perform dehydration polymerization.

After completion of the reaction, a fluid polymer was transferred to a Teflon (registered trademark) container, and then cooled and solidified to obtain about 640 g of colorless and transparent D-form-modified functional filler composition.

[23] Production of D-form-modifed Functional Filler Composition <Sample 25>

Melamine (15 g) was dissolved into D-lactic acid (manufactured by PURAC, 90% by mass solution, 1071 g), and the resulting solution was stirred overnight at 130° C. under argon bubbling and further stirred overnight at 160° C. to perform dehydration polymerization.

After completion of the reaction, a fluid polymer was transferred to a Teflon (registered trademark) container, and then cooled and solidified to obtain about 750 g of yellow and nontransparent D-form-modified functional filler composition.

[24] Production of D-form-modifed Functional Filler Composition <Sample 26>

SILAPLANE FMDA 11 (30 g) which was both terminal-hydroxylated polydimethyl(phenyl)siloxane manufactured by Chisso Cooperation was dispersed into D-lactic acid (manufactured by PURAC, 90% by mass solution, 300 g), and the resulting mixture was stirred overnight at 130° C. under argon bubbling and further stirred overnight at 160° C. to perform dehydration polymerization.

After completion of the reaction, a fluid polymer was transferred to a Teflon (registered trademark) container, and then cooled and solidified to obtain about 220 g of colorless and transparent D-form-modified functional filler composition.

[25] Production of D-form-modifed Functional Filler Composition <Sample 27>

SILAPLANE FM3311 (30 g) which was both terminal-aminated polydimethyl(phenyl)siloxane manufactured by Chisso Cooperation was dispersed into D-lactic acid (manufactured by PURAC, 90% by mass solution, 300 g), and the resulting mixture was stirred overnight at 130° C. under argon bubbling and further stirred overnight at 160° C. to perform dehydration polymerization.

After completion of the reaction, a fluid polymer was transferred to a Teflon (registered trademark) container, and then cooled and solidified to obtain about 230 g of yellow and transparent D-form-modified functional filler composition.

[26] Production of D-form-modifed Functional Filler Composition <Sample 28>

1,4-Phenylenediamine (5.6 g) was dissolved into D-lactic acid (manufactured by PURAC, 90% by mass solution, 515 g), and the resulting solution was stirred overnight at 130° C. under argon bubbling and further stirred overnight at 160° C. to perform dehydration polymerization.

After completion of the reaction, a fluid polymer was transferred to a Teflon (registered trademark) container, and then cooled and solidified to obtain about 350 g of yellow and transparent D-form-modified functional filler composition.

[27] Production of D-form-modifed Functional Filler Composition <Sample 29>

Hexamethylenediamine (3.4 g) was dissolved into D-lactic acid (manufactured by PURAC, 90% by mass solution, 302 g), and the resulting solution was stirred overnight at 130° C.

under argon bubbling and further stirred overnight at 160° C. to perform dehydration polymerization.

After completion of the reaction, a fluid polymer was transferred to a Teflon (registered trademark) container, and then cooled and solidified to obtain about 190 g of yellow and transparent D-form-modified functional filler composition.

[28] Production of L-form-modified Functional Filler Composition <Sample 30>

1,4-Phenylenediamine (8.3 g) was dissolved into L-lactic acid (manufactured by Musashino Chemical Laboratory, Ltd., 90% by mass solution, 773 g), and the resulting solution was stirred overnight at 130° C. under argon bubbling and further stirred overnight at 160° C. to perform dehydration polymerization.

After completion of the reaction, a fluid polymer was transferred to a Teflon (registered trademark) container, and then cooled and solidified to obtain about 590 g of yellow and transparent L-form-modified functional filler composition.

[29] Production of L-form-modified Functional Filler Composition <Sample 31>

Hexamethylenediamine (6.8 g) was dissolved into L-lactic acid (manufactured by Musashino Chemical Laboratory, Ltd., 90% by mass solution, 604 g), and the resulting solution was stirred overnight at 130° C. under argon bubbling and further stirred overnight at 160° C. to perform dehydration polymerization.

After completion of the reaction, a fluid polymer was transferred to a Teflon (registered trademark) container, and then cooled and solidified to obtain about 430 g of yellow and transparent L-form-modified functional filler composition.

[30] Production of D-form-modifed Functional Filler Composition <Sample 32>

4,4'-Biphenol (9.3 g) was dissolved into D-lactic acid (manufactured by PURAC, 90% by mass solution, 500 g), and the resulting solution was stirred overnight at 130° C. under argon bubbling and further stirred overnight at 160° C. to perform dehydration polymerization.

After completion of the reaction, a fluid polymer was transferred to a Teflon (registered trademark) container, and then cooled and solidified to obtain about 340 g of colorless and transparent D-form-modified functional filler composition.

[31] Production of D-form-modifed Functional Filler Composition <Sample 33>

Zirconium tetrapropoxide (70%, 1-propanol solution, 50 g) was dispersesd into D-lactic acid (manufactured by PURAC, 90% by mass solution, 250 g), and the resulting mixture was stirred overnight at 130° C. under argon bubbling and further stirred overnight at 160° C. to perform dehydration polymerization.

After completion of the reaction, a fluid polymer was transferred to a Teflon (registered trademark) container, and was cooled to obtain about 170 g of white solid D-form-modified functional filler composition.

[32] Production of D-form-modifed Functional Filler Composition <Sample 34>

1,3,5-Tris(2-hydroxyethyl)cyanuric acid (20 g) was dissolved into D-lactic acid (manufactured by PURAC, 90% by mass solution, 1150 g), and the resulting solution was stirred overnight at 130° C. under argon bubbling and further stirred overnight at 160° C. to perform dehydration polymerization.

After completion of the reaction, a fluid polymer was transferred to a Teflon (registered trademark) container, and then cooled and solidified to obtain about 800 g of colorless and transparent D-form-modified functional filler composition.

[33] Production of D-form-modifed Functional Filler Composition <Sample 35>

N,N'-Bis(2-hydroxyethyl)oxamide (21.1 g) was dissolved into D-lactic acid (manufactured by PURAC, 90% by mass solution, 1200 g), and the resulting solution was stirred overnight at 130° C. under argon bubbling and further stirred overnight at 160° C. to perform dehydration polymerization.

After completion of the reaction, a fluid polymer was transferred to a Teflon (registered trademark) container, and then cooled and solidified to obtain about 845 g of yellow and transparent D-form-modified functional filler composition.

[34] Production of D-form-modifed Functional Filler Composition <Sample 36>

Bisphenol (22.8 g) was dissolved into D-lactic acid (manufactured by PURAC, 90% by mass solution, 1200 g), and the resulting solution was stirred overnight at 130° C. under argon bubbling and further stirred overnight at 160° C. to perform dehydration polymerization.

After completion of the reaction, a fluid polymer was transferred to a Teflon (registered trademark) container, and then cooled and solidified to obtain about 837 g of yellow and transparent D-form-modified functional filler composition.

[35] Production of D-form-modifed Functional Filler Composition <Sample 37>

UC-CARB 100 (molecular weight: 1000, 98 g) which was polycarbonatediol manufactured by Ube Industries, Ltd., was dissolved into D-lactic acid (manufactured by PURAC, 90% by mass solution, 980 g), and the resulting solution was stirred overnight at 130° C. under argon bubbling and further stirred overnight at 160° C. to perform dehydration polymerization.

After completion of the reaction, a fluid polymer was transferred to a Teflon (registered trademark) container, and then cooled and solidified to obtain about 755 g of colorless and transparent D-form-modified functional filler composition.

[36] Production of D-form-modifed Functional Filler Composition <Sample 38>

Polycarbonatediol UH-200 (molecular weight: 1000, 150 g) which was polycarbonatediol manufactured by Ube Industries, Ltd., was dissolved into D-lactic acid (manufactured by PURAC, 90% by mass solution, 750 g), and the resulting solution was stirred overnight at 130° C. under argon bubbling and further stirred overnight at 160° C. to perform dehydration polymerization.

After completion of the reaction, a fluid polymer was transferred to a Teflon (registered trademark) container, and then cooled and solidified to obtain about 645 g of colorless and transparent D-form-modified functional filler composition.

[37] Production of D-form-modifed Functional Filler Composition <Sample 39>

Pentaerythritol (8.19 g) was dissolved into D-lactic acid (manufactured by PURAC, 90% by mass solution, 1200 g), and the resulting solution was stirred overnight at 130° C. under argon bubbling and further stirred overnight at 160° C. to perform dehydration polymerization. The terminal-hydroxy groups were acetylated by decreasing the reaction temperature to about 110° C., adding acetic anhydride (25 g), and further stirring overnight at 160° C.

After completion of the reaction, a fluid polymer was transferred to a Teflon (registered trademark) container, and then cooled and solidified to obtain about 805 g of colorless and transparent D-form-modified functional filler composition.

[38] Production of D-form-modifed Functional Filler Composition <Sample 40>

UC-CARB 100 (molecular weight: 1000, 200 g) which was polycarbonatediol manufactured by Ube Industries, Ltd., was dissolved into D-lactic acid (manufactured by PURAC, 90% by mass solution, 800 g), and the resulting solution was stirred overnight at 130° C. under argon bubbling and further stirred overnight at 160° C. to perform dehydration polymerization. The terminal-hydroxy groups were acetylated by decreasing the reaction temperature to about 110° C., adding acetic anhydride (41 g), and further stirring overnight at 160° C.

After completion of the reaction, a fluid polymer was transferred to a Teflon (registered trademark) container, and then cooled and solidified to obtain about 790 g of colorless and transparent D-form-modified functional filler composition.

[39] Production of D-form-modifed Functional Filler Composition <Sample 41>

Poltethylene glycol (molecular weight: 600, 100 g) was dissolved into D-lactic acid (manufactured by PURAC, 90% by mass solution, 1000 g), and the resulting solution was stirred overnight at 130° C. under argon bubbling and further stirred overnight at 160° C. to perform dehydration polymerization. The terminal-hydroxy groups were acetylated by decreasing the reaction temperature to about 110° C., adding acetic anhydride (35 g), and further stirring overnight at 160° C.

After completion of the reaction, a fluid polymer was transferred to a Teflon (registered trademark) container, and then cooled and solidified to obtain about 850 g of colorless and transparent D-form-modified functional filler composition.

[40] Production of D-form-modifed Functional Filler Composition <Sample 42>

Polytetrahydrofran (molecular weight 2000, 300 g) was dissolved into D-lactic acid (manufactured by PURAC, 90% by mass solution, 900 g), and the resulting solution was stirred overnight at 130° C. under argon bubbling and further stirred overnight at 160° C. to perform dehydration polymerization. The terminal-hydroxy groups were acetylated by decreasing the reaction temperature to about 110° C., adding acetic anhydride (31 g), and further stirring overnight at 160° C.

After completion of the reaction, a fluid polymer was transferred to a Teflon (registered trademark) container, and then cooled and solidified to obtain about 780 g of colorless and transparent D-form-modified functional filler composition.

[41] Production of D-form-modifed Functional Filler Composition <Sample 43>

UC-CARB 100 (molecular weight: 1000, 200 g) which was polycarbonatediol manufactured by Ube Industries, Ltd., was dissolved into D-lactic acid (manufactured by PURAC, 90% by mass solution, 800 g), and the resulting solution was stirred overnight at 130° C. under argon bubbling and further stirred overnight at 160° C. to perform dehydration polymerization. After the reaction temperature was decreased to about 110° C., RIKACIDHNA-100 (alicyclic acid anhydride manufactured by New Japan Chemical Co., Ltd., 28.8 g) was added and the mixture was stirred further overnight at 160° C.

After completion of the reaction, a fluid polymer was transferred to a Teflon (registered trademark) container, and then cooled and solidified to obtain about 710 g of colorless and transparent D-form-modified functional filler composition.

[42] Production of D-form-modifed Functional Filler Composition <Sample 44>

UC-CARB100 (molecular weight: 1000, 200 g) which was polycarbonatediol manufactured by Ube Industries, Ltd., was dissolved into D-lactic acid (manufactured by PURAC, 90% by mass solution, 800 g), and the resulting solution was stirred overnight at 130° C. under argon bubbling and further stirred overnight at 160° C. to perform dehydration polymerization. After the reaction temperature was decreased to about 110° C., isophoronediisocyanate 35.5 g) was added and the mixture was stirred further overnight at 170° C.

After completion of the reaction, a fluid polymer was transferred to a Teflon (registered trademark) container, and then cooled and solidified to obtain about 690 g of colorless and transparent D-form-modified functional filler composition.

The D-form-modified functional filler compositions and the L-form-modified functional filler compositions obtained in Production Example 1 are summarized and shown in Table 1.

TABLE 1

| Sample number | Raw material filler | Raw material filler size | Filler property | Notes |
|---|---|---|---|---|
| 1 | Amino silica | 3 μm | Colorless and transparent | |
| 2 | Amino silica | 3 μm | Colorless and transparent | |
| 3 | Amino silica | 3 μm | Yellowish brown and transparent | |
| 4 | Silica dispersed in methanol | 10-20 μm | Colorless and transparent | |
| 5 | Epoxysilica | 3 μm | Colorless and transparent | |
| 6 | Kunipia P | A few nm | Grey-green and non-transparent | |
| 7 | Aerosil silica 50 | A few dozens nm | Colorless and transparent | |
| 8 | Aerosil silica 50 | A few dozens nm | Colorless and transparent | L-lactic acid was used. |
| 9 | Hydroxyapatite | A few μm | White and non-transparent | |
| 10 | Pulp | A few μm | Yellowish brown and non-transparent | |
| 11 | Pentaerythritol | | Colorless and transparent | |
| 12 | Pentaerythritol | | Colorless and transparent | |
| 13 | Trimesic acid | | White and non-transparent | |
| 14 | Dipentaerythritol | | Colorless and transparent | |

TABLE 1-continued

| Sample number | Raw material filler | Raw material filler size | Filler property | Notes |
|---|---|---|---|---|
| 15 | Aerosil silica 300 | | Colorless and transparent | |
| 16 | Pilatex-LB | | Brown and semi-transparent | |
| 17 | Polytetrahydrofran 650 | | Colorless and transparent | |
| 18 | Polytetrahydrofran 250 | | Colorless and transparent | |
| 19 | myo-Inositol | | Colorless and transparent | |
| 20 | PEG600 | | Colorless and transparent | |
| 21 | Tetraethoxysilane | | Colorless and transparent | |
| 22 | Methyltriethoxy-silane | | white and semi-transparent | |
| 23 | Sila-ace S330 | | Yellow and transparent | |
| 24 | Sila-ace S510 | | Colorless and transparent | |
| 25 | Melamine | | Yellow and non-transparent | |
| 26 | Silaplane FMDA11 | | Colorless and transparent | |
| 27 | Silaplane FM3311 | | Yellow and transparent | |
| 28 | Phenylenediamine | | Yellow and transparent | |
| 29 | Hexamethylene-diamine | | Yellow and transparent | |
| 30 | Phenylenediamine | | Yellow and transparent | L-lactic acid was used. |
| 31 | Hexamethylene-diamine | | Yellow and transparent | L-lactic acid was used. |
| 32 | 4,4'-biphenol | | Colorless and transparent | |
| 33 | Zirconium tetrapropoxide | | White and non-transparent | |
| 34 | 1,3,5-Tris(2-hydroxy-ethyl)cyanuric acid | | Colorless and transparent | |
| 35 | N,N'-bis(hydroxy-ethyl)oxide | | Yellow and transparent | |
| 36 | Bisphenol | | Yellow and transparent | |
| 37 | Polycarbonatediol | | Colorless and transparent | |
| 38 | Polycarbonatediol | | Colorless and transparent | |
| 39 | Pentaerythritol | | Yellow and transparent | Terminal modified |
| 40 | Polycarbonatediol | | Yellow and transparent | Terminal modified |
| 41 | Polyethylene glycol | | Colorless and transparent | Terminal modified |
| 42 | Polytetrahydrofran | | Colorless and transparent | Terminal modified |
| 43 | Polycarbonatediol | | Colorless and transparent | Terminal modified |
| 44 | Polycarbonatediol | | Colorless and transparent | Terminal modified |

The viscosity of the functional filler composition solution in which the surface of the filler was treated with poly-D-lactic acid or poly-L-lactic acid had higher viscosity than that of the melt product of poly-L-lactic acid or poly-D-lactic acid polymerized in a similar condition except without adding a filler.

In the case of using an organic filler such as pentaerythritol as the raw material filler (Sample 11, or the like), since the organic filler itself had a size at the molecular level, the reaction proceeded effectively by sufficiently dispersing D-lactic acid, and the functional filler composition became transparent. On the other hand, in the state that the raw material organic filler such as trimesic acid had crystallinity and was a solid form and was not sufficiently dispersed into D-lactic acid, the raw material organic filler with a large partiparticle form remained and the functional filler composition appeared to be non-transparent. Further, most of the functional fillers in which the organic filler was used as the raw material filler were colorless and transparent, and only the functional filler in which the surface was aminated was yellow.

Test Example 1

Confirmation of Bonding of the Raw Material Filler and Polylactic Acid

1) IR was measured on Sample 28 and a raw material filler thereof, 1,4-phenylenediamine, using an IR measurement apparatus (MAGNA-IR760) manufactured by Nicoler Instrument Cooperation. The result is shown in FIG. 2.

Figure 2:
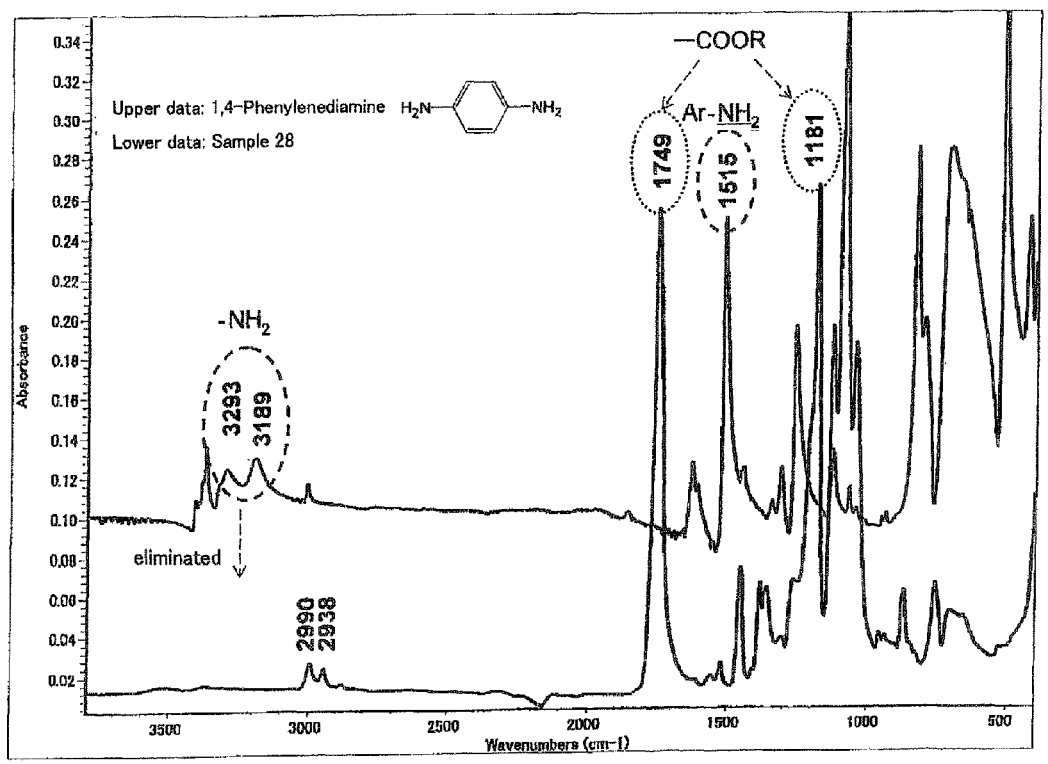
FIG. 2 is IR data of the functional filler of the present invention and raw material filler thereof.

As shown in FIG. 2, a peak by aromatic amine particlearly appears in the chart of 1,4-phenylenedimaine which is the raw material filler. On the other hand, the peak by an amino group disappears in the chart of Sample 28, and instead, a peak by an ester group particlearly appears. Therefore, it was proved that poly-D-lactic acid was bonded to both ends of 1,4-phenyleneamine in Sample 28.

2) NMR was measured on Sample 24 and a raw material filler thereof, 3-glycidoxypropyltrialkoxysilane, using an NMR measurement apparatus (JMM GSX270) manufactured by JEOL, Ltd. The result is shown in FIG. 3.

Figure 3:
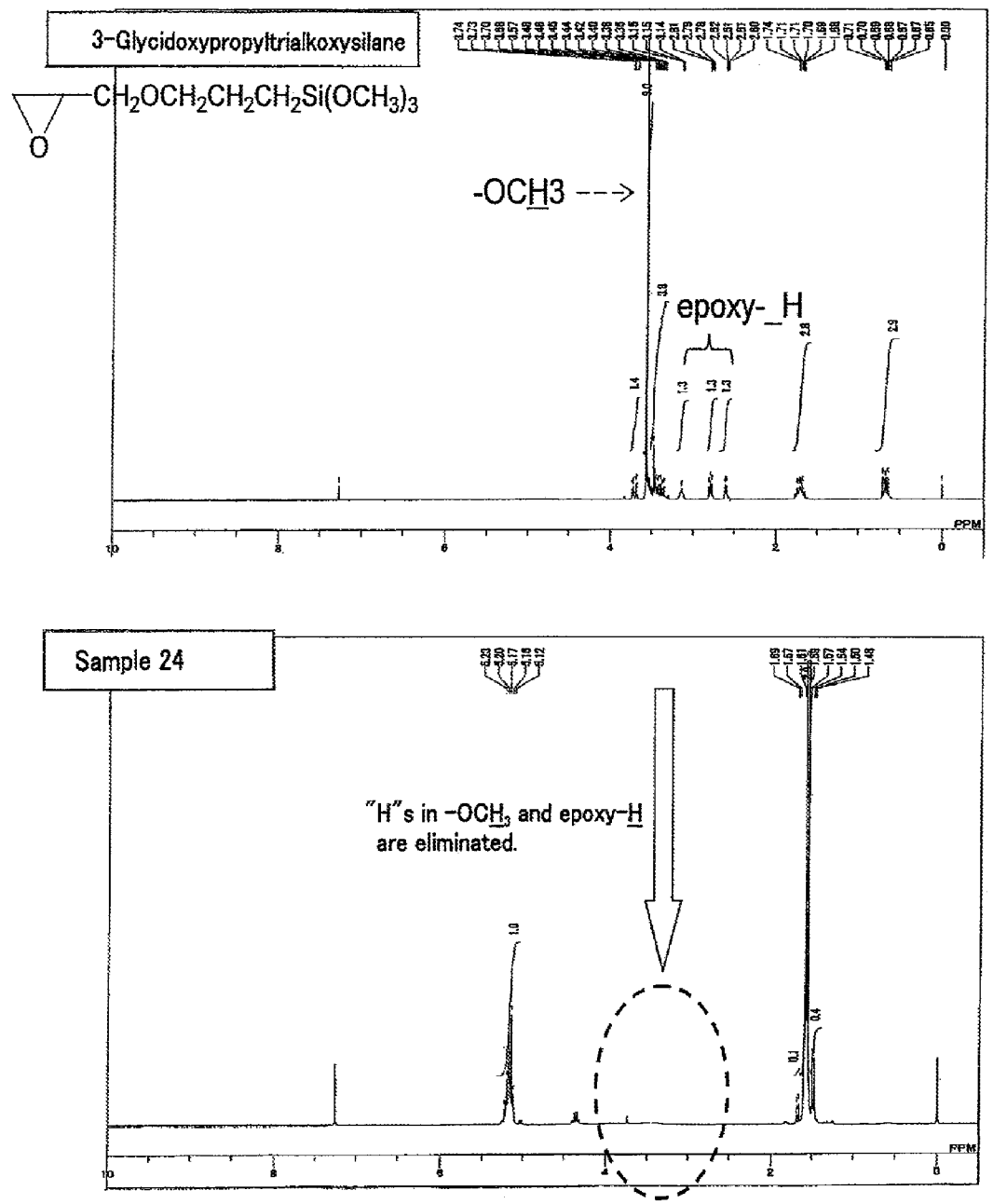
FIG. 3 is NMR data of the functional filler of the present invention and raw material filler thereof.

As shown in FIG. 3, a peak by a methoxy group and an epoxy group particlearly appears in the chart of 3-glycidoxypropyltrialkoxysilane. On the other hand, the peak by the methoxy group and the epoxy group disappears in the chart of Sample 24, and instead, a peak by poly-D-lactic acid appears. Therefore, it was proved that poly-D-lactic acid was bonded to both ends of 3-glycidoxypropyltrialkoxysilane in Sample 24.

Production Example 2

Production of Resin Composition Using Functional Filler Composition

The functional filler compositions 1 to 14 in which the surface was treated with poly-D-lactic acid or poly-L-lactic acid, obtained in Production Example 1, were melted and kneaded with a homo-poly-L-lactic acid (weight average molecular weight: 200,000, Tm=170° C.) as a matrix, at 190° C. for 15 minutes with a laboratory kneader mill so that the weight ratio of the former: the later was 1:10, thereby to obtain a resin composition in which the functional filler was homogenously dispersed. The resin compositions were made into a pellet and used in a structure analysis, or the like.

Test Example 2

Evaluation of the Thermal Characteristics

The resin compositions obtained in Production Example 2 were heated, and behaviors thereof were observed. The results are shown in Table 2.

TABLE 2

| Sample number | Functional filler composition Raw material filler | Tg (° C.) | Tc (° C.) | Tm1 (° C.) | Tm2 (° C.) |
|---|---|---|---|---|---|
| No filler (only polylactic acid) | — | 58 | 115 | 172 | — |
| 1, 2, 3 | Surface-aminated silica | — | — | 170 | 216 |
| 4 | Nanosilica | — | — | 170 | 216 |
| 5 | Surface-epoxylated silica | — | — | 170 | 216 |
| 6 | Kunipia P | — | — | 170 | 216 |
| 7 | Aerosil silica | — | — | 170 | 216 |
| 8 | Aerosil silica | 58 | 115 | 170 | — |
| 9 | Linear hydroxyapatite | — | — | 170 | 216 |
| 11, 12 | Pentaerythritol | — | — | 170 | 216 |
| 13 | Trimesic acid | — | — | 170 | 216 |
| 14 | Dipentaerythritol | — | — | 170 | 216 |

As shown in Table 2, the compositions in which the resin composition containing a functional filler treated with poly-D-lactic acid was melted and kneaded with poly-L-lactic acid other than Sample 8 do not show a particlear Tg and Tc. Further, the compositions showed a melting point Tm by a homo-poly-L-lactic acid of a matrix polymer around 170° C., and showed a melting point Tm2 considered to be due to a stereo complex formed from poly-L-lactic acid and poly-D-lactic acid around 216° C. On the other hand, the resin composition of sample number 8 containing the functional filler treated with poly-L-lactic acid shows a particlear Tg and Tc, and does not have the melting point Tm2 by stereo complex.

An increase of a crystallization speed after molding and improvement of heat resistance become possible by molding the resin composition containing the functional filler treated with poly-D-lactic acid between two melting points. In detail, in the case of molding the resin composition of the present invention at a temperature between two melting points, polylactic acid itself melts, and on the other hand, the stereo complex of the functional filler with polylactic acid does not melt. As a result, since the stereo complex is a crystal at molding, the stereo complex becomes a nuparticleus at cooling after molding and promotes crystallization of polylactic acid. Further, since many stereocomplexes exist as a nuparticleus, many crystals with a relatively small size are produced after cooling, and the heat resistance is improved.

As described above, the resin composition of the present invention is found to have characteristics of having a good moldability and also good heat resistance.

Test Example 3

Evaluation of Moldability and Physical Properties of the Resin Composition Containing the Functional Filler The resin compositions obtained in Production Example 2 was molded into sheets having 0.2 mm thickness by hot-pressing at 190° C. under pressure of 30 MPa for 3 minutes, and then rapidly cooling with cold pressing. Heat treatment was further performed on the sheets at 130° C. for 1 hour in order to complete the crystallization.

The transparencies of these sheets were evaluated by light transmittance. The result is shown in Table 3.

TABLE 3

| Sample number | Functional filler composition Raw material filler | Rapidly cooled sheet | Heat treated sheet | Notes |
|---|---|---|---|---|
| No filler (only polylactic acid) | — | Transparent, colorless | Non-transparent, white | Crystal size large |
| 1, 2, 3 | Surface-aminated silica | Transparent, yellow | Transparent, yellow | Crystal size small |
| 4 | Nanosilica | Transparent, colorless | Transparent, colorless | Crystal size small |
| 5 | Surface-epoxylated silica | Transparent, colorless | Transparent, colorless | Crystal size small |
| 6 | Kunipia P | Transparent, yellow | Non-transparent, yellow | Crystal size large |
| 7 | Aerosil silica | Transparent, colorless | Transparent, colorless | Crystal size small |
| 8 | Aerosil silica | Transparent, colorless | Non-transparent, white | Crystal size large |
| 9 | Linear hydroxyapatite | Non-transparent, white | Non-transparent, white | Crystal size small, filler size large |
| 11, 12 | Pentaerythritol | Transparent, colorless | Transparent, colorless | Crystal size small |
| 13 | Trimesic acid | Non-transparent, white | Non-transparent, white | Dispersibility of trimesic acid was poor |
| 14 | Dipentaerythritol | Transparent, colorless | Transparent, colorless | Crystal size small |

As the result described in Table 3, in the case of not containing the functional filler of the present invention, the rapidly cooled sheet was transparent. However, the heat treated sheet became white and non-transparent. This showed that a large spherical-shaped crystal of polylactic acid was formed by crystallization. Therefore, the conventional sheet becomes very brittle in the aspect of physical properties and is inappropriate in practical use, since there is no bonding force between domains of the large spherical-shaped crystals although it has regular heat resistance in addition to the non-transparent properties. In the case that the raw material filler was surface-epoxylated silica, surface-aminated silica, nanosilica or AEROSIL SILICA (Sample 8 treated with poly-L-lactic acid was excluded), any of the rapidly cooled sheet and the heat treated sheet maintained transparency, and it was shown that the size of the crystallized spherical-shaped crystal produced was finer than the size of light wavelength.

It was found that the dispersibility of the filler in the resin composition in which the functional filler composition having montmorillonite (manufactured by Kunimine Industries Co., Ltd., Kunipia P) as the raw material filler was remarkably improved. However, whitening due to the heat treatment showed that the size of the produced spherical-shaped crystal by the heat treatment became large. Further, in the case that fibrous hydroxyapatite was used as the raw material filler, it was considered that a composite became non-transparent since the partiparticle size of fibrous hydroxyapatite was large.

Moreover, crystallinity of the heat treated sheet can be evaluated with DSC, and for any of the sheets, a melting point Tm1 of poly-L-lactic acid was observed around 170° C. and a melting point Tm2 due to a stereo complex formed from poly-L-lactic acid and poly-D-lactic acid was observed around 216° C. Therefore, the resin composition is excellent in moldability and heat resistance.

Test Example 4

Evaluation of Heat Resistance

Evaluation of the heat resistance of the sheet was performed with the heat sag test described above, and the heat resistance was evaluated by how much the tip of the sheet was lowered from the horizon after the heat treatment according JIS K7195. When the distance of lowering was less than 10 mm, the sheet was shown to be thermally stable at this temperature. The result in which the sheets were treated at 130° C. for one hour is shown in Table 4.

TABLE 4

| | | Deformation amount and heat resistance evaluation | | | |
|---|---|---|---|---|---|
| | Functional filler composition | Rapidly cooled sheet | | Heat treated sheet | |
| Sample number | Raw material filler | Deformed amount | Heat resistance | Deformed amount | Heat resistance |
| No filler (only | — | >50 mm | Poor | <10 mm | Good |

TABLE 4-continued

| | | Deformation amount and heat resistance evaluation | | | |
|---|---|---|---|---|---|
| Functional filler composition | | Rapidly cooled sheet | | Heat treated sheet | |
| Sample number | Raw material filler | Deformed amount | Heat resistance | Deformed amount | Heat resistance |
| polylactic acid) | | | | | |
| 1, 2, 3 | Surface-aminated silica | <10 mm | Good | <10 mm | Good |
| 4 | Nanosilica | <10 mm | Good | <10 mm | Good |
| 5 | Surface-epoxylated silica | <10 mm | Good | <10 mm | Good |
| 6 | Kunipia P | <10 mm | Good | <10 mm | Good |
| 7 | Aerosil silica | <10 mm | Good | <10 mm | Good |
| 8 | Aerosil silica | >50 mm | Poor | <10 mm | Good |
| 9 | Linear hydroxyapatite | <10 mm | Good | <10 mm | Good |
| 11, 12 | Pentaerythritol | <10 mm | Good | <10 mm | Good |
| 13 | Trimesic acid | <10 mm | Good | <10 mm | Good |
| 14 | Dipentaerythritol | <10 mm | Good | <10 mm | Good |

The rapidly cooled sheet without a filler and the rapidly cooled sheet in which the functional filler composition of Sample 8 was blended were deformed right away at 130° C., and showed a large deformed amount. This was considered to be because, since Tg was around 60° C. when only homo-polylactic acid was included, the sheet was easily deformed at that temperature or more. The sheet without a filler treated at 130° C. for one hour had heat resistance. However, the sheet was non-transparent.

On the other hand, the heat resistance of any of the resin compositions of the present invention (one in which the functional filler composition of Sample 8 was blended was excluded) was excellent. This was considered to be because the resin compositions of the present invention did not have a particlear Tg as a result in the above-described Test Example 2.

Production Example 3

Production of Pellet

Pellets were produced using the functional filler of the present invention, as a material of various molded bodies. Specifically, the functional filler and the matrix poly-L-lactic acid were kneaded at a ratio of functional filler:poly-L-lactic acid=1:9 using a biaxial extruder (manufactured by Technovel Cooperation, KZW15-30MG:L/D). At that time, the cylinder temperature was set to 180° C. and the die temperature was set to 173° C., and a strand was cut directly with a pelletizer to obtain a pellet with 2 to 3 cm length. The thermal characteristics of the obtained pellet are as follows.

TABLE 5

| Sample number | Raw material filler | Thermal characteristics of | | | |
|---|---|---|---|---|---|
| | | Tg | Tc | Tm1 | Tm2 |
| 12 | Pentaerythritol | — | — | 168 | 203.9 |
| 22 | PEG 600 | — | — | 170 | 205.2 |
| 23 | Tetraethoxysilane | — | — | 170 | 200.0 |
| 24 | Methylethoxysilane | — | — | 170 | 185.6 |
| 25 | Sila-ace S330 | — | — | 170 | 189.8 |
| 26 | Sila-ace S510 | — | — | 170 | 192.8 |
| 27 | Melamine | — | — | 170 | 211.8 |
| 28 | Silaplane FMDA11 | — | — | 170 | 203.9 |
| 29 | Silaplane FM3311 | — | — | 170 | 205.8 |
| 30 | Phenylenediamine | — | — | 170 | 190.5 |
| 31 | Hexamethylenediamine | — | — | 170 | 195.7 |
| 34 | 4,4'-biphenol | — | — | 170 | 200.6 |
| 35 | Zirconium tetrapropoxide | — | — | 170 | 201.7 |
| 36 | 1,3,5-tris(2-hydroxyethyl)cyanuric acid | — | — | 170 | 202.3 |
| 37 | N,N'-bis(hydroxyethyl)oxide | — | — | 170 | 199.3 |
| 38 | Bisphenol | — | — | 170 | 210.5 |
| 39 | Polycarbonatediol | — | — | 170 | 205.4 |
| 40 | Polycarbonatediol | — | — | 170 | 203.5 |

Though the kneading temperature was a little better than the normal kneading temperature of polylactic acid, the stereo complex played a role of a nucleating agent when polylactic acid was extruded from a nozzle. As a result, the extruded polylactic acid composite material solidified at room temperature, and could be directly cut without cooling with water. Compared with a homo-poly-L-lactic acid, it was found that the resin composition of the present invention had a melting point of polylactic acid stereo complex between 190 and 210° C. other than the homo-polylactic acid melting point around 170° C. The stereo complex part became large with the increase of the added amount of the functional filler, and a crystallized polylactic acid composition could be easily obtained.

The composite pellet produced in Production Example 3 was applied to the various molding methods as follows.

Production Example 4

A resin composition containing a functional filler having an organic substance as the raw material filler was selected in the resin compositions of the present invention prepared in Production Example 3, the functional filler content was changed, and the composition was applied to an injection molding. Specifically, the cylinder temperature was made to be the stereo complex melt temperature or more, and the nozzle temperature was made to be the stereo complex temperature or less. By making the cylinder temperature to be the stereo complex melt temperature or more, the functional filler-containing polylactic acid composite material was sufficiently melted in the cylinder, and mixed homogenously. Further, by making the nozzle temperature to be the stereo complex temperature or less, the injected stereo complex became solid right away. The mold temperature was set to 27° C., and the mold cyparticle was set to 20 seconds. The impact strength of each molded body was measured using Izod impact strength test machine manufactured by Toyo Seiki Kogyo Co., Ltd. according to JIS K7110. The result is shown in Table 6.

TABLE 6

| Sample number | Raw material filler | Filler content (% by mass) | Cylinder temperature (°C.) | Die temperature (°C.) | Impact strength (KJ/m²) | Molded product property |
|---|---|---|---|---|---|---|
| 12 | Pentaerythritol | 5 | 210 | 180 | 3.1 | Transparent |
|  |  | 10 |  |  | 2.8 |  |
| 22 | PEG600 | 5 | 220 | 220 | 3.0 | Transparent |
|  |  | 10 |  |  | 2.9 |  |
|  |  | 20 |  |  | 2.4 |  |
| 23 | Tetraethoxysilane | 5 | 210 | 200 | 3.4 | Transparent |
|  |  | 10 |  |  | 3.1 |  |
| 24 | Methyl-triethoxysilane | 5 | 210 | 200 | 2.8 | Transparent |
|  |  | 10 |  |  | 2.9 |  |
| 25 | Sila-ace S330 | 5 | 210 | 200 | 2.8 | Transparent |
|  |  | 10 |  |  | 2.9 |  |
| 26 | Sila-ace S510 | 5 | 210 | 200 | 2.8 | Transparent |
|  |  | 10 |  |  | 2.9 |  |
| 27 | Melamine | 5 | 210 | 200 | 2.8 | Transparent |
|  |  | 10 |  |  | 2.9 |  |
| 28 | Silaplane FMDA11 | 5 | 210 | 200 | 2.8 | Transparent |
|  |  | 10 |  |  | 2.9 |  |
| 29 | Silaplane FM3311 | 5 | 210 | 200 | 2.8 | Transparent |
|  |  | 10 |  |  | 2.9 |  |
| 30 | Phenylenediamine | 5 | 210 | 200 | 2.8 | Transparent |
|  |  | 10 |  |  | 2.9 |  |
| 31 | Hexamethylene-diamine | 5 | 210 | 200 | 2.8 | Transparent |
|  |  | 10 |  |  | 2.9 |  |
| 34 | 4,4'-biphenol | 5 | 210 | 200 | 3.2 | Transparent |
|  |  | 10 |  |  | 3.1 |  |
| 35 | Zirconium tetrapropoxide | 5 | 210 | 200 | 3.0 | Transparent |
|  |  | 10 |  |  | 2.9 |  |
| 36 | 1,3,5-tris(2-hydroxy-ethyl)cyanuric acid | 5 | 210 | 200 | 3.5 | Transparent |
|  |  | 10 |  |  | 3.2 |  |
| 37 | N,N'-bis(hydroxy-ethyl)oxide | 5 | 210 | 200 | 3.1 | Transparent |
|  |  | 10 |  |  | 2.8 |  |
| 38 | Bisphenol | 5 | 210 | 200 | 3.2 | Transparent |
|  |  | 10 |  |  | 3.0 |  |
| 39 | Polycarbonatediol (UC-CARB100) | 5 | 210 | 200 | 3.4 | Transparent |
|  |  | 10 |  |  | 3.2 |  |
| 40 | Polycarbonatediol (UH-200) | 5 | 210 | 200 | 2.9 | Transparent |
|  |  | 10 |  |  | 2.8 |  |

The stereo complex formed with the functional filler of the present invention and polylactic acid became a nuparticleus of the crystal after injected, promoted solidification, shortened the molding cyparticle, and at the same time, transparency of the molded body could be improved.

Further, the impact strength of the conventional homo-polylactic acid is 2.6 KJ/m². On the other hand, the impact strength could be improved to about 3.0 KJ/m² in case that the added amount of the functional filler of the present invention was made to be 5 to 10% by mass as in the above-described result. However, when the added amount of the functional filler was increased to 20% by mass, the impact strength rather decreased.

Production Example 5

A pellet containing the functional filler in which pentaerythritol and AEROSIL SILICA were made to be the raw material filler in the pellets produced in Production Example 3 was applied to a carbon dioxide foaming under the following condition. The result is as follows.

TABLE 7

| Raw material filler | Foaming condition | | |
|---|---|---|---|
|  | Chamber temperature (°C.) | $CO_2$ soaking pressure (MPa) | Time (minute) |
| Pentaerythritol |  |  |  |
| 5 mass % | 170 | 20 | 240 |
| 10 mass % | 170 | 20 | 240 |
| 20 mass % | 170 | 20 | 240 |
| 30 mass % | 170 | 20 | 240 |
| Aerosil silica |  |  |  |
| 5 mass % | 170 | 20 | 240 |
| 10 mass % | 200 | 20 | 240 |
| 20 mass % | 200 | 20 | 240 |
| 30 mass % | 200 | 20 | 240 |

By the formation of the stereo complex of the functional filler and polylactic acid, the stereo complex was in a solid state even at the melting point of a normal polylactic acid or more, and the effect of improving the viscosity of polylactic acid was exhibited. Furthermore, with the existence of the stereo complex, the foamed polylactic acid molded product was crystallized at a foaming step, and showed higher heat resistance than that of a non-crystalline polylactic acid foamed body. In the view of the physical properties of one foamed by carbon dioxide, a foam molding of even polylactic acid that hardly foamed became possible by adding a small amount of filler, the heat resistance thereof was 100° C. or more, and it was found that the molded product could take the place of the PS foaming body used in everyday life.

Production Example 6

Melt-spinning of Sample 12 containing the functional filler in which pentaerythritol was used as the raw material filler among the composite products kneaded in Example 3 was performed in the following condition.

TABLE 8

| Raw material filler Pentaerythritol | Melt-spinning temperature | |
|---|---|---|
| | Cylinder temperature (° C.) | Die temperature (° C.) |
| 5 mass % | 180 | 170 |
| 10 mass % | 180 | 170 |
| 20 mass % | 180 | 170 |

The spinning of the resin composition of the present invention is preferably performed at the melting point of homo-polylactic acid or more and the melting point of the stereo complex or less. The reason is because the viscosity becomes considerably low when the stereo complex may melt and become difficult to be molded product. Therefore, by spinning at the melting point of homo-polymer or more and the melting point of the stereo complex or less, and with the stereo complex partially forming, homo-polymers connect together, and an apparent long molecular can be spun. In the present example, the spinning temperature was set to 170° C., and a multi-filament was obtained with a melt-spinning. Further, since there was not a change in the viscosity, the spinning could be performed without necessity of especially improving the existing apparatus using the resin composition of the present invention.

Production Example 7

The pellet containing the functional filler in which dipentaerythritol and AEROSIL SILICA were used as the raw material filler among the pellets produced in Production Example 3 was formed into a sheet.

TABLE 9

| Polymerization initiator | Sheet molding temperature | | Heat properties of T die extruding molded product | | | |
|---|---|---|---|---|---|---|
| | Cylinder temperature (° C.) | T die temperature (° C.) | Tg (° C.) | Tc1 (° C.) | Tm1 (° C.) | Tm2 (° C.) |
| Dipentaerythritol | | | | | | |
| 20 mass % | 180 | 170 | 53.7 | 99.1 | 162.3 | 210 |
| 30 mass % Aerosil silica (1:10) | 180 | 170 | 55.9 | 109.6 | 164.3 | 210.3 |
| 30 mass % | 190 | 180 | 54.2 | — | 164.5 | 211.6 |

As the above-described result, in the case that the added amount of the functional filler was large, the molded sheet started having heat resistance from the point when the molded came out from T die. Such heat resistance was considered to be obtained by that it became easily to be crystallized due to the stereo complex and that mobility of the polylactic acid molecule was restricted. The polylactic sheet released from the T die had both transparency and heat resistance, and a secondary process was also possible.

Production Example 8

Spinning of a mono-filament was performed using the resin composition of Sample 39 containing the functional filler in which pentaerythritol was used as the raw material filler and the ends thereof were treated with acetic anhydride. Specifically, the resin composition was melted at 170 to 190° C. with a mono-axial melt-extruder to be ejected from a spinneret of 1.2 mm diameter, and passed in warm water of 60° C. through a gap of 50 mm. In the warm water, the composition was solidified while sufficient tension was kept, and 5-times stretching was performed in hot water of 90° C. Furthermore, 2-times stretching was performed in super-heated steam of 130° C. Then, a mono-filament was obtained by performing a heat treatment while the length was kept in air of 150 to 180° C. The obtained mono-filament was transparent and flexible, and had a fineness of 300 dTex. Further, the strength of the filament was measured. As a result, the filament had extremely high strength for a mono-filament as the maximum strength being 600 MPa and the elongation at break being 33%.

Production Example 9

AEROSIL SILICA A300 (manufactured by Nippon Aerosil Co., Ltd., a spherical silica having average partiparticle size 30 nm, 56 parts by mass) was dispersed into ethanol (2000 parts by mass) in which water (100 parts by mass) was added, 3-aminopropyltriethoxysilane (20 parts by mass) was added, and the mixture was stirred at room temperature for 24 hours. Surface-aminated silica (60 parts by mass) was obtained by filtering the silica partiparticle at a reduced pressure, particleaning with ethanol, and drying at 100° C.

Subsequently, the surface-aminated silica (50 parts by mass) was dispersed into D-lactic acid (manufactured by PURAC, 90% by mass, 550 parts by mass) in a 1 L four-necked flask, and then the resulting mixture was stirred for 24 hours at 140° C. under argon bubbling to perform dehydration polymerization. Progress of the polymerization reaction was confirmed with the amount of the produced water. After the completion of the reaction, a viscous liquid product which was slightly yellowish and transparent was obtained. The obtained functional filler composition was almost transparent, and this showed that the silica partiparticles were almost completely dispersed into poly-D-lactic acid. The reaction product was extruded in a strand shape under the flask, cut, and made into a pellet. The above-described functional filler composition consisted of silica nano-partiparticles of 11% by mass and poly-D-lactic acid of 89% by mass. As the result of the GPC measurement, the weight average molecular weight (Mw) of poly-D-lactic acid that did not bond to the filler was 3300. The present functional filler (10% by mass) was dry-blended with poly-L-lactic acid (melting point: 173° C., weight average molecular weight: 180,000, 90% by mass), melted and kneaded at 180 to 200° C. using a biaxial kneader, and then the resin composition was obtained by making it into a pellet by air cooling.

The spinning of a mono-filament was performed as below using the resin composition. The resin composition was melted at 170 to 190° C. and ejected from a spinneret of 1.2 mm diameter with a mono-axial melt-extruder, and passed in warm water of 60° C. through a gap of 50 mm. In the warm water, the composition was solidified while sufficient tension was kept, and 5-times stretching was performed in hot water of 90° C. Furthermore, 2-times stretching was performed in superheated steam of 130° C. Then, a transparent and flexible mono-filament of 350 dTex having a hardness was obtained by performing a heat treatment at a constant length in air of 150 to 180° C. The obtained mono-filament was polylactic acid fiber having extremely excellent physical properties with the maximum strength of 610 MPa and the elongation at break being 36%.

Production Example 10

A multi-filament was produced using the resin composition of Sample 41 containing the functional filler in which polyethylene glycol (molecular weight 600) was used as the raw material filler and the ends thereof was treated with acetic anhydride. Specifically, a non-stretched yarn was obtained by extruding the resin composition from a spinneret having 32 pores of pore diameter 0.25 mm into air to be solidified, and winding at 800 m/minute. Then, the non-stretched yarn was stretched 5-times with a hot roller of 95° C., and further stretched 2.5-times with a hot roller at 135° C. Next, a multi-filament of 75 dTex/32 fil was obtained by performing a heat treatment by contacting a hot plate at 150° C. while the length was kept. The maximum strength of the multi-filament was 780 MPa, the initial modulus of elasticity was 10500 MPa (10.5 GPa), and the elongation at break was 43%. According to the a result, it was proved that a multi-filament having excellent physical properties could be obtained by using the resin composition of the present invention as a raw material.

Production Example 11

A semi-stretched yarn was obtained by using the same resin composition as Production Example 10 and spinning at 3000 m/minute. This semi-stretched yarn was stretched 5-times with a heat roller having a surface temperature of 120° C., and further stretched 3-times with a heat roller having a surface temperature at 135° C. Then, a multi-filament of 50 dTex/32fil was obtained by performing a heat treatment by contacting the stretched yarn with a hot plate of 150° C. while the length was kept. The maximum strength of the multi-filament was 1.30 GPa, the initial modulus of elasticity was 16 GPa, and the elongation at break was 29%. According to the result, it was proved that a multi-filament having high strength and high modulus of elasticity at a level that had never been reported could be obtained by using the resin composition of the present invention as a raw material.

Production Example 12

Pentaerythritol (13.6 parts) and 90% of D-lactic acid solution (2000 parts) were mixed, reacted for 24 hours at 140° C. under argon bubbling, and further reacted for 24 hours at 170° C. As a result, 1430 parts of the functional filler in which poly-D-lactic acid was bonded to four hydroxide group ends of pentaerythritol was obtained. The functional filler and poly-L-lactic acid (melting point=165° C., Mw=185,000) were mixed at a ratio of 5:95 in a mass conversion. The mixture was supplied in a single axial kneader having an inflation spinneret, kneaded and melted at a temperature of 170 to 190° C., and extruded into air with the usual method from a circular spinneret set at 180 to 190° C. After being extruded, the mixture was blown to three times with air pressure. After blowing, the mixture was molded into a sheet of 15 mm width through a slitter right away. Then, the sheet was primary stretched 4-times in the longitudinal direction with a plate heater with a surface temperature 120° C. Furthermore, the primary stretched tape was secondary stretched 2.5 times with a plate heater with a surface temperature of 140° C. A flat yarn of 600 dTex was obtained by performing a heat treatment on the secondary stretched tape at a constant length with a heater with a surface temperature of 150° C. The tensile strength of the flat yarn was 5.6 cN/dTex, the tensile elongation at break was 27%, and the hot water shrinkage rate was 1.6%.

For comparison, production of a flat yarn was attempted only with poly-L-lactic acid in a similar way as described above except that the functional filler of the present invention was not used. However, the tape was easily melted and broke with heat at the primary stretching, a stretching spot was generated by local heat, and good stretching could not be performed. Further, production of a flat yarn was attempted only with poly-D-lactic acid having large molecular weight in a similar way as described above except that the functional filler of the present invention was not used. As a result, the blow film itself was very brittle, the formation of balloons was difficult, and even the formation of a sheet could not be performed.

Production Example 13

Polyethylene glycol 600 (manufactured by Kanto Chemical Co., Inc., PEG-600, 100 parts) and 90% of D-lactic acid aqueous solution (1000 parts) were mixed, reacted for 24 hours at 140° C. under argon bubbling, and further reacted for 24 hours at 170° C. As a result, 750 parts of the functional filler in which poly-D-lactic acid was bonded to two OH group ends of PEG-600 was obtained. The functional filler and poly-L-lactic acid (melting point=165° C., Mw=185, 000) were mixed at a ratio of 7.5:92.5 in a mass conversion. The mixture was supplied in a single axial kneader having an inflation spinneret, kneaded and melted at a temperature of 165 to 180° C., and extruded into air with the usual method from a circular spinneret set at 170 to 180° C. After being extruded, the mixture was blown to 2.5 times lengthwise and 2 times crosswise with air pressure, and made into a film of 30 μm thickness. The film was folded in two with a usual method, and wound in a tube shape.

The physical properties of the obtained tube were measured with DSC. As a result, a melting peak of polylactic acid was confirmed at around 170° C., and about 1 to 2 melting peaks of the complex of poly-L-lactic acid constituting a matrix with poly-D-lactic acid originated from the functional filler were confirmed at around 190 to 200° C.

For comparison, a similar film was produced only with polylactic acid without using the functional filler of the present invention. As a result of measuring the obtained film with DSC, a crystallization peak of polylactic acid was confirmed at around 100° C., and a melting peak was confirmed at around 170° C. From this result of DSC, it was found that the degree of crystallization of the film increased and the heat resistance of the obtained film was improved by adding the functional filler of the present invention.

Industrial Applicability

The realization of the following cases become possible with the present invention.

1. Homogenous dispersibility of the filler for a liquid, a polymer or the like as a matrix can be improved. Therefore, the development of various additives, nucleating agents, reinforcing materials and lubricants which are excellent in various physical properties becomes possible.
2. Physical properties such as strength and moldability of polylactic acid composition can be improved.
3. Heat resistance and mechanical strength of a pellet, a sheet, a film, an injection-molded body, an extrusion-molded body, an inflation film, a fiber or the like and other application products including polylactic acid as the main component can be improved.

The invention claimed is:

1. A method for producing a functional filler, comprising a step of:
   mixing a solution of D-lactic acid or L-lactic acid and/or D-lactide or L-lactide with a silicon-based alkoxide to perform a dehydration polymerization reaction,
   wherein the D-lactic acid or L-lactic acid and/or D-lactide or L-lactide is polymerized to obtain a poly-D-lactic acid or poly-L-lactic acid, wherein the poly-D-lactic acid consists of 80% or more of D-lactic acid and the poly-L-lactic acid consists of 80% or more of L-lactic acid, and
   wherein the silicon-based alkoxide is polymerized and the poly-D-lactic acid or poly-L-lactic acid is chemically bound to a reactive group on the polymerized silicon-based alkoxide.

2. The method according to claim 1,
   wherein an excessive amount of the D-lactic acid or L-lactic acid and/or D-lactide or L-lactide is mixed with the silicon-based alkoxide during mixing the solution with the silicon-based alkoxide.

3. A method for producing a resin composition comprising a step of
   mixing the functional filler of claim 1 with a polylactic acid as a matrix polymer, wherein at least part of the polylactic acid interacts with a poly-D-lactic acid or a poly-L-lactic acid bonded to the polymerized silicone-based alkoxide of the functional filler.

* * * * *